(12) United States Patent
Arndt et al.

(10) Patent No.: US 7,398,337 B2
(45) Date of Patent: Jul. 8, 2008

(54) ASSOCIATION OF HOST TRANSLATIONS THAT ARE ASSOCIATED TO AN ACCESS CONTROL LEVEL ON A PCI BRIDGE THAT SUPPORTS VIRTUALIZATION

(75) Inventors: Richard Louis Arndt, Austin, TX (US); Patrick Allen Buckland, Austin, TX (US); Harvey Gene Kiel, Rochester, MN (US); Renato John Recio, Austin, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/066,931

(22) Filed: Feb. 25, 2005

(65) Prior Publication Data

US 2006/0195675 A1 Aug. 31, 2006

(51) Int. Cl.
G06F 13/28 (2006.01)
G06F 3/00 (2006.01)
G06F 9/34 (2006.01)

(52) U.S. Cl. .............. 710/37; 710/1; 710/8; 710/9; 710/10; 710/34; 710/36; 710/313; 711/1; 711/200; 711/141

(58) Field of Classification Search ............. 710/1, 710/8–10, 34, 36, 37, 313; 711/1, 141, 200
See application file for complete search history.

(56) References Cited

U.S. PATENT DOCUMENTS

| | | | |
|---|---|---|---|
| 6,111,894 | A | 8/2000 | Bender et al. |
| 6,134,641 | A | 10/2000 | Anand |
| 6,453,392 | B1 | 9/2002 | Flynn, Jr. |
| 6,629,157 | B1 | 9/2003 | Falardeau et al. |
| 6,629,162 | B1 | 9/2003 | Arndt et al. |
| 6,662,289 | B1 | 12/2003 | Ang |
| 6,665,759 | B2 | 12/2003 | Dawkins et al. |
| 6,704,284 | B1 | 3/2004 | Stevenson et al. |
| 6,804,741 | B2 | 10/2004 | Cowan |

(Continued)

FOREIGN PATENT DOCUMENTS

EP 1508855 A2 8/2004

OTHER PUBLICATIONS

"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

(Continued)

*Primary Examiner*—Tammara Peyton
(74) *Attorney, Agent, or Firm*—Duke W. Yee; Matthew W. Baca; Lisa L. B. Yociss

(57) ABSTRACT

A method, computer program product, and distributed data processing system that allows a system image within a multiple system image virtual server to directly expose a portion, or all, of its associated system memory to a shared PCI adapter without having to go through a trusted component, such as a Hypervisor. Specifically, the present invention is directed to a mechanism for sharing conventional PCI I/O adapters, PCI-X I/O Adapters, PCI-Express I/O Adapters, and, in general, any I/O adapter that uses a memory mapped I/O interface for communications.

26 Claims, 14 Drawing Sheets

U.S. PATENT DOCUMENTS

| | | | |
|---|---|---|---|
| 6,823,404 B2 * | 11/2004 | Arndt et al. | 710/36 |
| 6,823,418 B2 | 11/2004 | Langendorf et al. | |
| 6,880,021 B2 | 4/2005 | Easton et al. | |
| 6,973,510 B2 | 12/2005 | Arndt et al. | |
| 7,080,291 B2 | 7/2006 | Moriki et al. | |
| 2002/0069335 A1 | 6/2002 | Flynn, Jr. | |
| 2002/0085493 A1 | 7/2002 | Pekkala et al. | |
| 2002/0112102 A1 | 8/2002 | Tarui et al. | |
| 2002/0129172 A1 | 9/2002 | Baskey et al. | |
| 2002/0129212 A1 | 9/2002 | Lee et al. | |
| 2003/0014738 A1 | 1/2003 | Dawkins et al. | |
| 2003/0061379 A1 | 3/2003 | Craddock et al. | |
| 2003/0110205 A1 | 6/2003 | Johnson | |
| 2003/0204648 A1 | 10/2003 | Arndt | |
| 2003/0236852 A1 | 12/2003 | Fernandes et al. | |
| 2004/0202189 A1 | 10/2004 | Arndt et al. | |
| 2005/0044301 A1 * | 2/2005 | Vasilevsky | 711/1 |
| 2005/0076157 A1 | 4/2005 | Serizawa et al. | |
| 2005/0091365 A1 | 4/2005 | Lowell et al. | |
| 2005/0097384 A1 | 5/2005 | Uehara et al. | |
| 2005/0102682 A1 | 5/2005 | Shah et al. | |
| 2005/0119996 A1 | 6/2005 | Ohata et al. | |
| 2005/0120160 A1 | 6/2005 | Plouffe et al. | |
| 2005/0182788 A1 | 8/2005 | Arndt et al. | |
| 2005/0240932 A1 | 10/2005 | Billau et al. | |
| 2005/0246450 A1 | 11/2005 | Enko et al. | |
| 2006/0044301 A1 | 3/2006 | Ha | |
| 2006/0069828 A1 | 3/2006 | Goldsmith | |
| 2006/0112376 A1 | 5/2006 | Broberg et al. | |
| 2006/0184349 A1 | 8/2006 | Goud et al. | |
| 2006/0239287 A1 | 10/2006 | Johnsen et al. | |
| 2006/0242330 A1 | 10/2006 | Torudbakken et al. | |
| 2006/0242332 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |

OTHER PUBLICATIONS

Jann et al., "Dynamic Reconfiguration: Basic Building Blocks for Autonomic Computing on IBM PSeries Servers," IBM System Journal, vol. 42, Jan. 2003 pp. 29-37.

"Logical Partition Security in the IBM @server pSeries 690", IBM, 2002, pp. 1-13.

Hensbergen, "The Effect of Virtualization on OS Interference", IBM Research, Proceedings of 1st workshop on Operating Systems Inteference in High Performance Applications, Aug. 2005, p. 1-6.

U.S. Appl. No. 11/066,424, filed Feb. 25, 2005, Arndt et al.
U.S. Appl. No. 11/066,645, filed Feb. 25, 2005, Arndt et al.
U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/066,419, filed Feb. 25, 2005, Arndt et al.
U.S. Appl. No. 11/068,664, filed Feb. 28, 2005, Arndt et al.
U.S. Appl. No. 11/066,353, filed Feb. 25, 2005, Arndt et al.
U.S. Appl. No. 11/065,830, filed Feb. 25, 2005, Arndt et al.
U.S. Appl. No. 11/065,829, filed Feb. 25, 2005, Arndt et al.
U.S. Appl. No. 11/066,517, filed Feb. 25, 2005, Arndt et al.
U.S. Appl. No. 11/065,821, filed Feb. 25, 2005, Arndt et al.
U.S. Appl. No. 11/066,487, filed Feb. 25, 2005, Arndt et al.
U.S. Appl. No. 11/066,519, filed Feb. 25, 2005, Arndt et al.
U.S. Appl. No. 11/066,521, filed Feb. 25, 2005, Arndt et al.
U.S. Appl. No. 11/067/354, filed Feb. 25, 2005, Arndt et al.
U.S. Appl. No. 11/066,590, filed Feb. 25, 2005, Arndt et al.
U.S. Appl. No. 11/065,823, filed Feb. 25, 2005, Arndt et al.

* cited by examiner

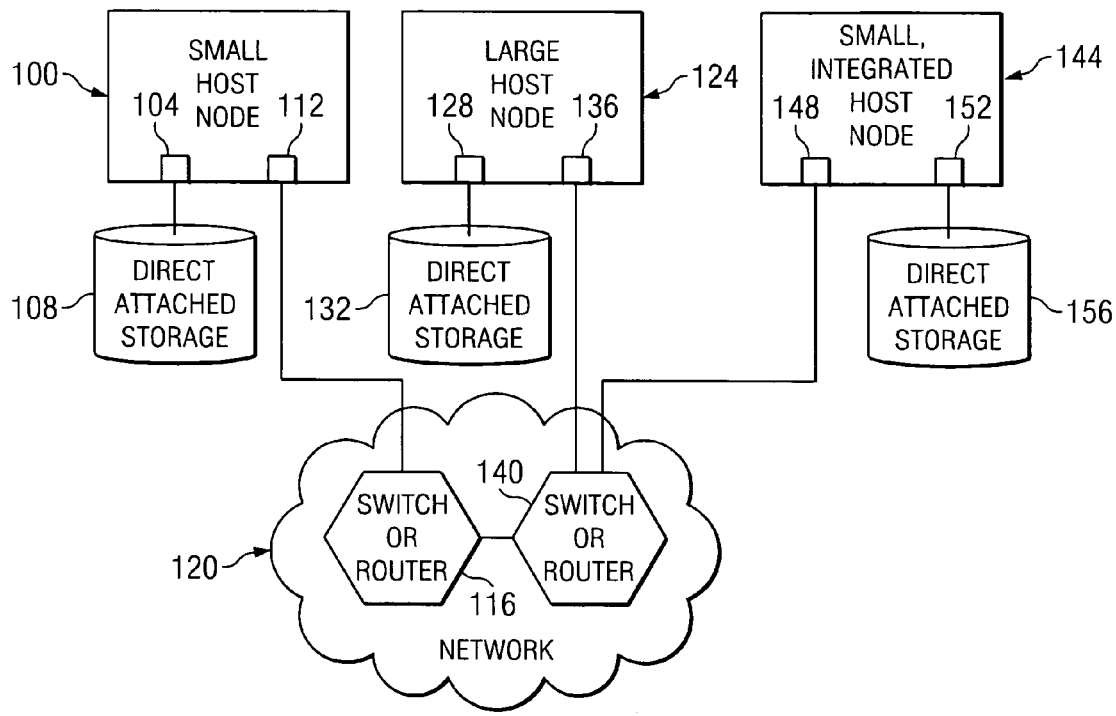
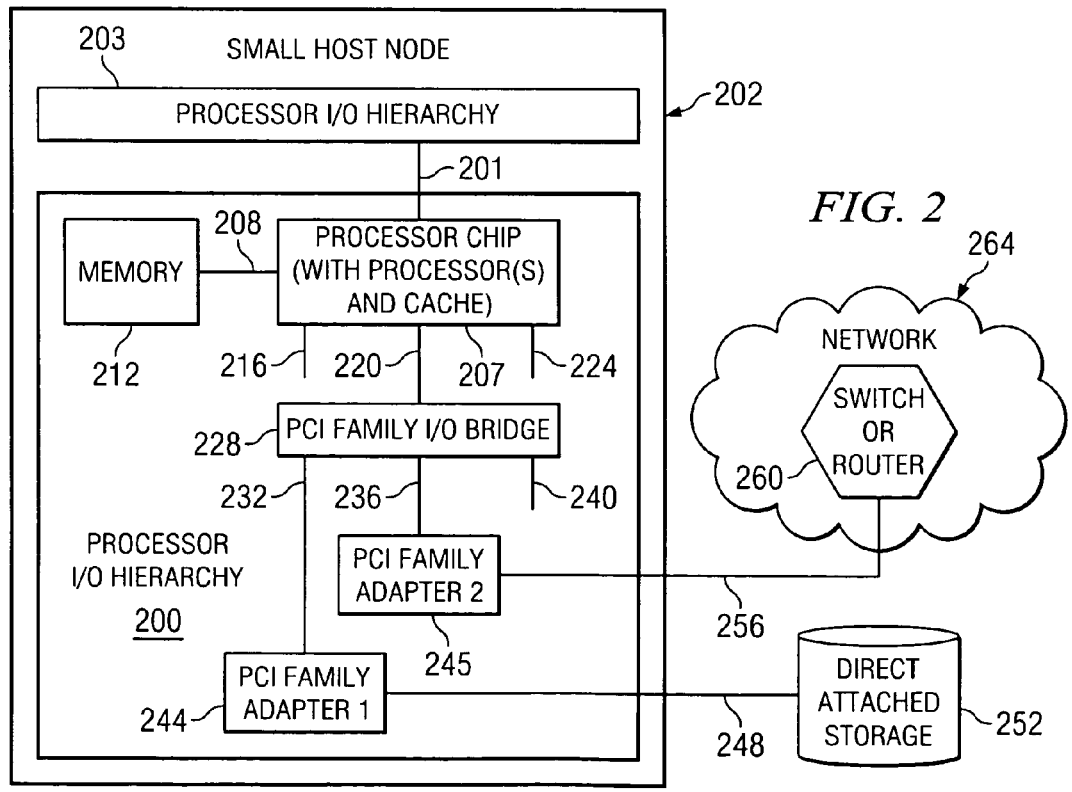

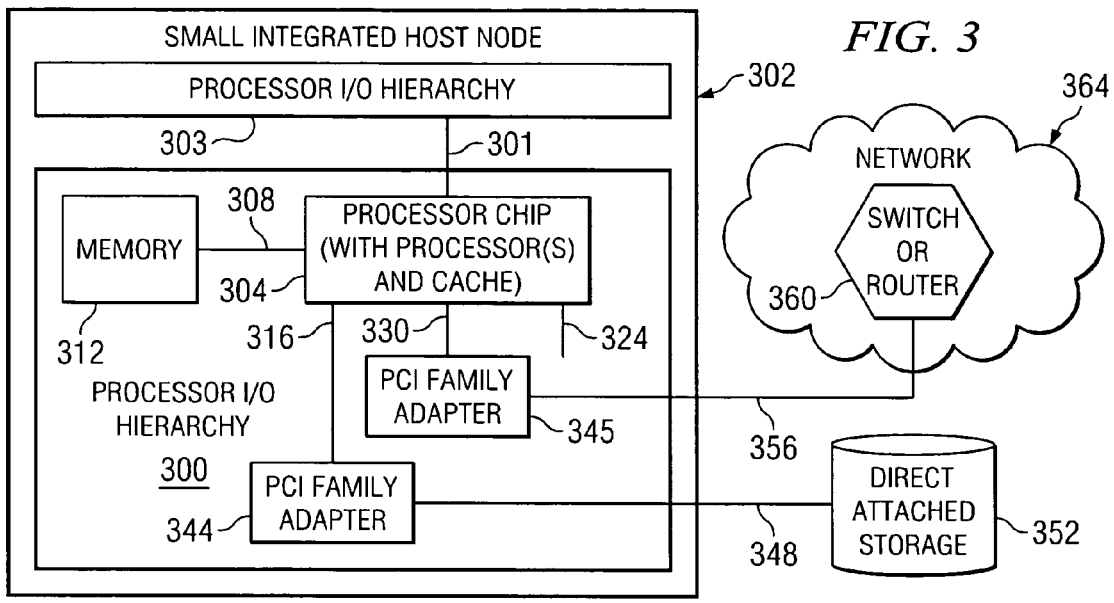

ASSOCIATION OF HOST TRANSLATIONS THAT ARE ASSOCIATED TO AN ACCESS CONTROL LEVEL ON A PCI BRIDGE THAT SUPPORTS VIRTUALIZATION

CROSS-REFERENCE TO RELATED APPLICATIONS

This application is related to commonly assigned and co-pending U.S. patent application Ser. No. 11/066,424 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System"; U.S. patent application Ser. No. 11/065,869 entitled "Virtualized Fibre Channel Adapter for a Multi-Processor Data Processing System"; U.S. Pat. No. 7,260,664, entitled "Interrupt Mechanism on an IO Adapter That Supports Virtualization"; U.S. patent application Ser. No. 11/066,201 entitled "System and Method for Modification of Virtual Adapter Resources in a Logically Partitioned Data Processing System"; U.S. patent application Ser. No. 11/065,818 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources"; U.S. patent application Ser. No. 11/066,296 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/065,823 entitled "Method, Apparatus, and Computer Program Product for Coordinating Error Reporting and Reset Utilizing an I/O Adapter that Supports Virtualization"; U.S. patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification; U.S. patent application Ser. No. 11/067,354 entitled "System and Method for Providing Quality of Service in a Virtual Adapter"; and U.S. patent application Ser. No. 11/066,590 entitled "System and Method for Managing Metrics Table per Virtual Port in a Logically Partitioned Data Processing System" all of which are hereby incorporated by reference.

BACKGROUND OF THE INVENTION

1. Technical Field

The present invention relates generally to communication protocols between a host computer and an input/output (I/O) Adapter. More specifically, the present invention provides an implementation for virtualizing resources on a physical I/O. In particular, the present invention provides a mechanism by which the combination of a host address translation and protection table and a Peripheral Component Interconnect (PCI) adapter, such as a PCI, PCI-X, or PCI-E adapter, address translation and protection table can be used to associate a system image to a set of system memory addresses, such that a system image within a multiple system image virtual server can directly expose a portion or all of its associated system memory to a PCI adapter that is shared by multiple system images.

2. Description of Related Art

Virtualization is the creation of substitutes for real resources. The substitutes have the same functions and external interfaces as their real counterparts, but differ in attributes such as size, performance, and cost. These substitutes are virtual resources and their users are usually unaware of the substitute's existence. Servers have used two basic approaches to virtualize system resources: Partitioning and Hypervisors. Partitioning creates virtual servers as fractions of a physical server's resources, typically in coarse (e.g., physical) allocation units (e.g., a whole processor, along with its associated memory and I/O adapters). Hypervisors are software or firmware components that can virtualize all server resources with fine granularity (e.g., in small fractions of a single physical resource).

Servers that support virtualization presently have two options for handling I/O. The first option is to not allow a single physical I/O adapter to be shared between virtual servers. The second option is to add function into the Hypervisor, or another intermediary, that provides the isolation necessary to permit multiple operating systems to share a single physical adapter.

The first option has several problems. One significant problem is that expensive adapters cannot be shared between virtual servers. If a virtual server only needs to use a fraction of an expensive adapter, an entire adapter would be dedicated to the server. As the number of virtual servers on the physical server increases, this leads to underutilization of the adapters and more importantly a more expensive solution, because each virtual server needs a physical adapter dedicated to it. For physical servers that support many virtual servers, another significant problem with this option is that it requires many adapter slots, with all the accompanying hardware (e.g., chips, connectors, cables, etc.) required to attach those adapters to the physical server.

Though the second option provides a mechanism for sharing adapters between virtual servers, that mechanism must be invoked and executed on every I/O transaction. The invocation and execution of the sharing mechanism by the Hypervisor or other intermediary on every I/O transaction degrades performance. It also leads to a more expensive solution, because the customer must purchase more hardware, either to make up for the cycles used to perform the sharing mechanism or, if the sharing mechanism is offloaded to an intermediary, for the intermediary hardware.

Therefore, it would be advantageous to have an improved method, apparatus, and computer instructions that allows a system image within a multiple system image virtual server to directly expose a portion or all of its associated system memory to a shared PCI adapter without having to go through a trusted component, such as a Hypervisor. It would also be advantageous to have the mechanism apply for Ethernet Network Interface Controllers (NICs), Fibre Channel (FC) Host Bus Adapters (HBAs), parallel SCSI (pSCSI) HBAs, Infini-Band, TCP/IP Offload Engines, Remote Direct Memory Access (RDMA) enabled NICs, iSCSI adapters, iSCSI Extensions for RDMA (iSER) adapters, and any other type of adapter that supports a memory mapped I/O interface.

SUMMARY OF THE INVENTION

The present invention provides a method, computer program product, and distributed data processing system that allows a system image within a multiple system image virtual server to directly expose a portion, or all, of its associated system memory to a shared PCI adapter without having to go through a trusted component, such as a Hypervisor. Specifically, the present invention is directed to a mechanism for sharing conventional PCI I/O adapters, PCI-X I/O Adapters, PCI-Express I/O Adapters, and, in general, any I/O adapter that uses a memory mapped I/O interface for communications.

When a direct memory access or interrupt operation is received from a virtual resource, a host ASIC looks up an entry associated with the virtual resource within an index table using virtual resource bus number, device number, and function number included in the direct memory access or interrupt operation. The entry contains a pointer to an address translation and protection table, which is used to translate a bus address in the direct memory access or interrupt operation to a real memory address needed to access real memory on the host. The host ASIC then determines whether the real memory address resulting from the translation step is associated with the system image and the virtual resource information included in the direct memory access or interrupt operation. If so, the direct memory access or interrupt operation is performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram of a distributed computer system illustrated in accordance with a preferred embodiment of the present invention;

FIG. 2 is a functional block diagram of a small host processor node in accordance with a preferred embodiment of the present invention;

FIG. 3 is a functional block diagram of a small, integrated host processor node in accordance with a preferred embodiment of the present invention;

FIG. 5 is a diagram illustrating the key elements of the parallel Peripheral Computer Interface (PCI) bus protocol in accordance with a preferred embodiment of the present;

DETAILED DESCRIPTION OF THE PREFERRED EMBODIMENT

Figure 4:
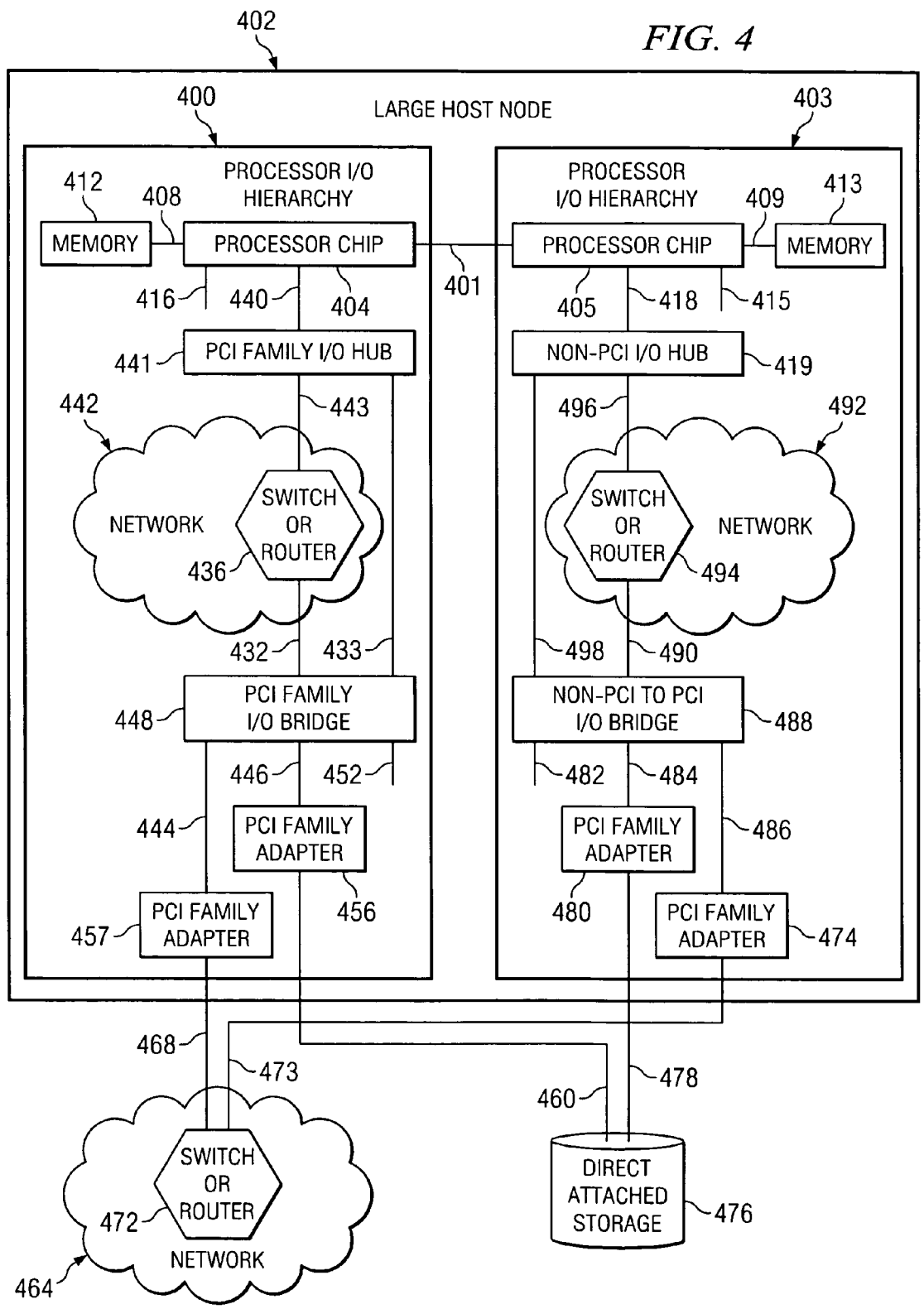
FIG. 4 is a functional block diagram of a large host processor node in accordance with a preferred embodiment of the present invention.

The present invention applies to any general or special purpose host that uses PCI family I/O adapter to directly attach storage or to attach to a network, where the network consists of endnodes, switches, router and the links interconnecting these components. The network links can be Fibre Channel, Ethernet, InfiniBand, Advanced Switching Interconnect, or a proprietary link that uses proprietary or standard protocols.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120, and is provided merely for illustrative purposes and the embodiments of the present invention described below can be implemented on computer systems of numerous other types and configurations. Two switches (or routers) are shown inside of network 120—switch 116 and switch 140. Switch 116 connects to small host node 100 through port 112. Small host node 100 also contains a second type of port 104 which connects to a direct attached storage subsystem, such as direct attached storage 108.

Network 120 can also attach large host node 124 through port 136 which attaches to switch 140. Large host node 124 can also contain a second type of port 128, which connects to a direct attached storage subsystem, such as direct attached storage 132.

Network 120 can also attach a small integrated host node 144 which is connected to network 120 through port 148 which attaches to switch 140. Small integrated host node 144 can also contain a second type of port 152 which connects to a direct attached storage subsystem, such as direct attached storage 156.

Turning next to FIG. 2, a functional block diagram of a small host node is depicted in accordance with a preferred embodiment of the present invention. Small host node 202 is an example of a host processor node, such as small host node 100 shown in FIG. 1.

In this example, small host node 202 includes two processor I/O hierarchies, such as processor I/O hierarchy 200 and 203, which are interconnected through link 201. In the illustrative example of FIG. 2, processor I/O hierarchy 200 includes processor chip 207 which includes one or more processors and their associated caches. Processor chip 207 is connected to memory 212 through link 208. One of the links on processor chip, such as link 220, connects to PCI family I/O bridge 228. PCI family I/O bridge 228 has one or more PCI family (e.g., PCI, PCI-X, PCI-Express, or any future generation of PCI) links that is used to connect other PCI family I/O bridges or a PCI family I/O adapter, such as PCI family adapter 244 and PCI family adapter 245, through a PCI link, such as link 232, 236, and 240. PCI family adapter 245 can also be used to connect a network, such as network 264, through a link via either a switch or router, such as switch or router 260. PCI family adapter 244 can be used to connect direct attached storage, such as direct attached storage 252, through link 248. Processor I/O hierarchy 203 may be configured in a manner similar to that shown and described with reference to processor I/O hierarchy 200.

With reference now to FIG. 3, a functional block diagram of a small integrated host node is depicted in accordance with a preferred embodiment of the present invention. Small integrated host node 302 is an example of a host processor node, such as small integrated host node 144 shown in FIG. 1.

In this example, small integrated host node 302 includes two processor I/O hierarchies 300 and 303, which are interconnected through link 301. In the illustrative example, processor I/O hierarchy 300 includes processor chip 304, which is representative of one or more processors and associated caches. Processor chip 304 is connected to memory 312 through link 308. One of the links on the processor chip, such as link 330, connects to a PCI family adapter, such as PCI family adapter 345. Processor chip 304 has one or more PCI family (e.g., PCI, PCI-X, PCI-Express, or any future generation of PCI) links that is used to connect either PCI family I/O bridges or a PCI family I/O adapter, such as PCI family adapter 344 and PCI family adapter 345 through a PCI link, such as link 316, 330, and 324. PCI family adapter 345 can also be used to connect with a network, such as network 364, through link 356 via either a switch or router, such as switch or router 360. PCI family adapter 344 can be used to connect with direct attached storage 352 through link 348.

Turning now to FIG. 4, a functional block diagram of a large host node is depicted in accordance with a preferred embodiment of the present invention. Large host node 402 is an example of a host processor node, such as large host node 124 shown in FIG. 1.

In this example, large host node 402 includes two processor I/O hierarchies 400 and 403 interconnected through link 401. In the illustrative example of FIG. 4, processor I/O hierarchy 400 includes processor chip 404, which is representative of one or more processors and associated caches. Processor chip 404 is connected to memory 412 through link 408. One of the links, such as link 440, on the processor chip connects to a PCI family I/O hub, such as PCI family I/O hub 441. The PCI family I/O hub uses a network 442 to attach to a PCI family I/O bridge 448. That is, PCI family I/O bridge 448 is connected to switch or router 436 through link 432 and switch or router 436 also attaches to PCI family I/O hub 441 through link 443. Network 442 allows the PCI family I/O hub and PCI family I/O bridge to be placed in different packages. PCI family I/O bridge 448 has one or more PCI family (e.g., PCI, PCI-X, PCI-Express, or any future generation of PCI) links that is used to connect with other PCI family I/O bridges or a PCI family I/O adapter, such as PCI family adapter 456 and PCI family adapter 457 through a PCI link, such as link 444, 446, and 452. PCI family adapter 456 can be used to connect direct attached storage 476 through link 460. PCI family adapter 457 can also be used to connect with network 464 through link 468 via, for example, either a switch or router 472.

Turning next to FIG. 5, illustrations of the phases contained in a PCI bus transaction 500 and a PCI-X bus transaction 520 are depicted in accordance with a preferred embodiment of the present invention. PCI bus transaction 500 depicts a conventional PCI bus transaction that forms the unit of information which is transferred through a PCI fabric for conventional PCI. PCI-X bus transaction 520 depicts the PCI-X bus transaction that forms the unit of information which is transferred through a PCI fabric for PCI-X.

PCI bus transaction 500 shows three phases: an address phase 508; a data phase 512; and a turnaround cycle 516. Also depicted is the arbitration for next transfer 504, which can occur simultaneously with the address, data, and turnaround cycle phases. For PCI, the address contained in the address phase is used to route a bus transaction from the adapter to the host and from the host to the adapter.

PCI-X transaction 520 shows five phases: an address phase 528; an attribute phase 532; a response phase 560; a data phase 564; and a turnaround cycle 566. Also depicted is the arbitration for next transfer 524 which can occur simultaneously with the address, attribute, response, data, and turnaround cycle phases. Similar to conventional PCI, PCI-X uses the address contained in the address phase to route a bus transaction from the adapter to the host and from the host to the adapter. However, PCI-X adds the attribute phase 532 which contains three fields that define the bus transaction requester, namely: requestor bus number 544, requestor device number 548, and requestor function number 552 (collectively referred to herein as a BDF). The bus transaction also contains a tag 540 that uniquely identifies the specific bus transaction in relation to other bus transactions that are outstanding between the requester and a responder. The byte count 556 contains a count of the number of bytes being sent.

Figure 6:
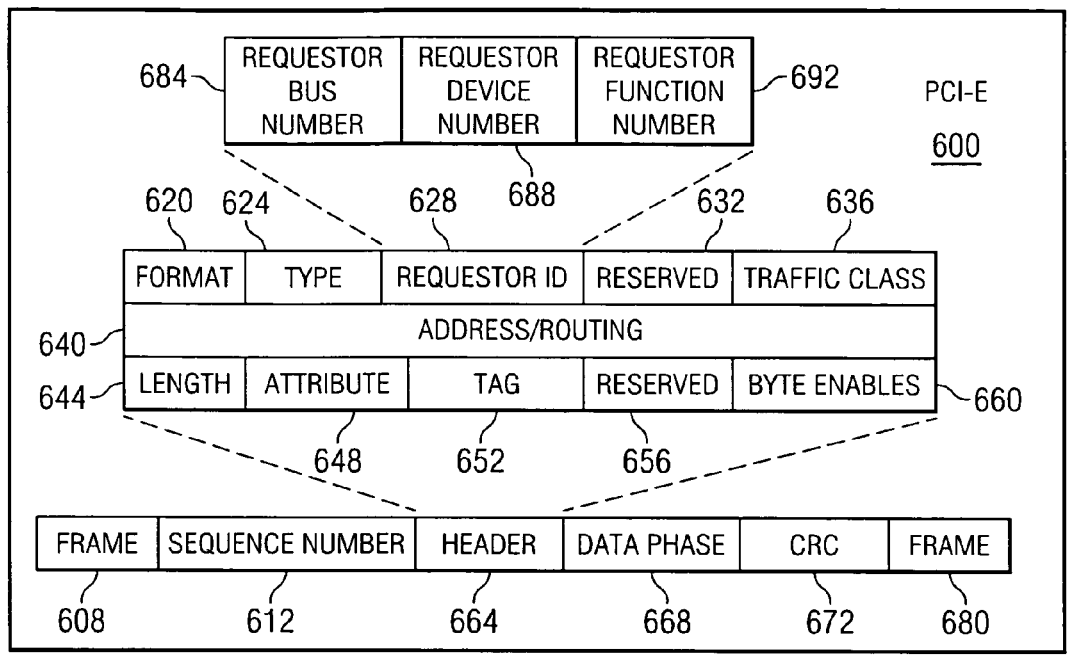
FIG. 6 is a diagram illustrating the key elements of the serial PCI bus protocol (PCI-Express, a.k.a. PCI-E) in accordance with a preferred embodiment of the present.

Turning now to FIG. 6, an illustration of the phases contained in a PCI-Express bus transaction is depicted in accordance with a preferred embodiment of the present invention. PCI-E bus transaction 600 forms the unit of information which is transferred through a PCI fabric for PCI-E.

PCI-E bus transaction 600 shows six phases: frame phase 608; sequence number 612; header 664; data phase 668; cyclical redundancy check (CRC) 672; and frame phase 680. PCI-E header 664 contains a set of fields defined in the PCI-Express specification. The requester identifier (ID) field 628 contains three fields that define the bus transaction requester, namely: requester bus number 684, requester device number 688, and requester function number 692. The PCI-E header also contains tag 652, which uniquely identifies the specific bus transaction in relation to other bus transactions that are outstanding between the requester and a responder. The length field 644 contains a count of the number of bytes being sent.

Figure 7:
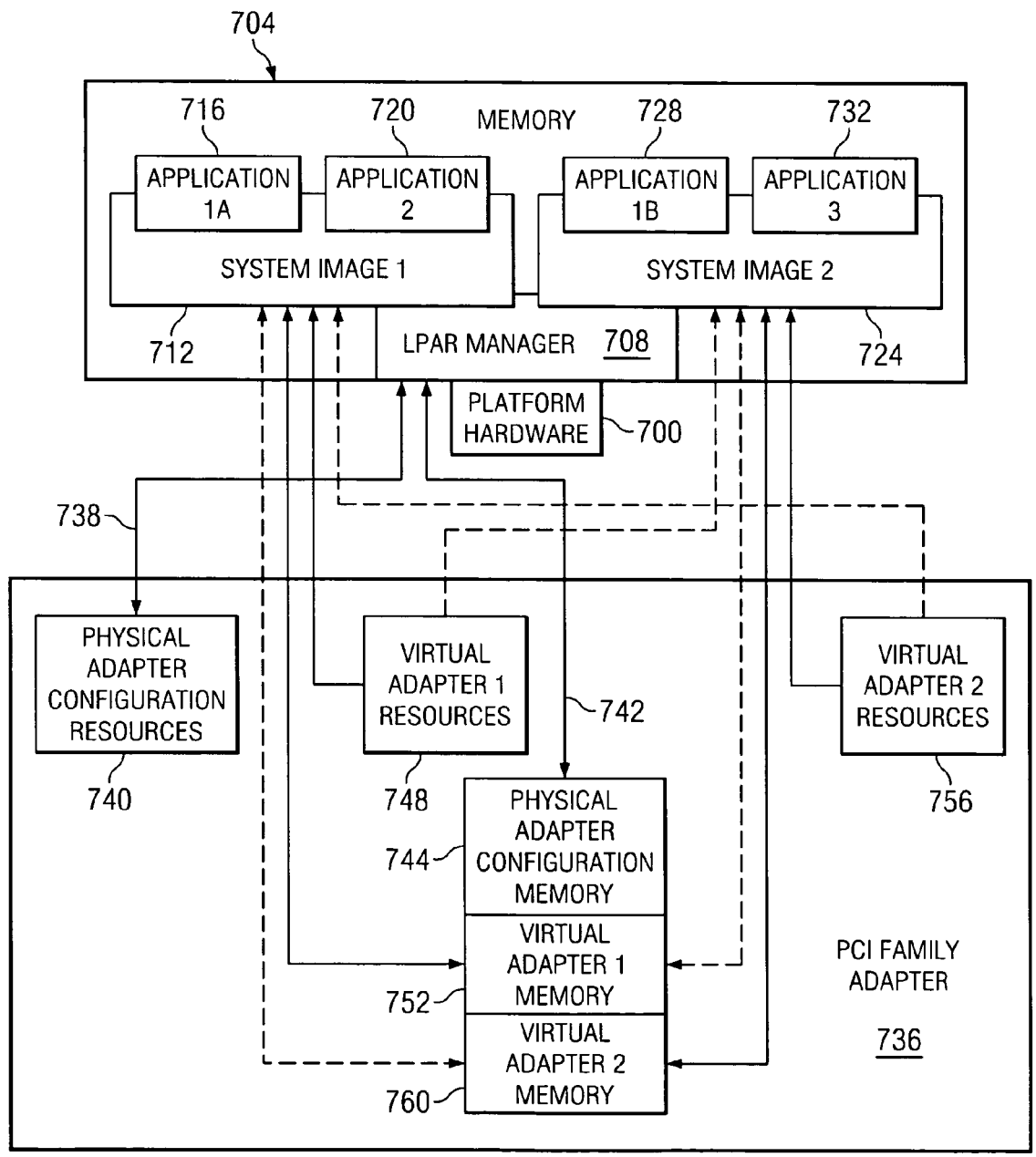
FIG. 7 is a diagram illustrating the I/O virtualization functions that must be provided in a host processor node in order to provide virtual host access isolation in accordance with the present invention.

With reference now to FIG. 7, a functional block diagram of a PCI adapter, such as PCI family adapter 736, and the firmware and software that run on host hardware (e.g. processor with possibly an I/O hub or I/O bridge), such as host hardware 700, is depicted in accordance with a preferred embodiment of the present invention.

FIG. 7 also shows a logical partitioning (LPAR) manager 708 running on host hardware 700. LPAR manager 708 may be implemented as a Hypervisor manufactured by International Business Machines, Inc. of Armonk, N.Y. LPAR manager 708 can run in firmware, software, or a combination of the two. LPAR manager 708 hosts two system image (SI) partitions, such as system image 712 and system image 724 (illustratively designated system image 1 and system image 2, respectively). The system image partitions may be respective operating systems running in software, a special purpose image running in software, such as a storage block server or storage file server image, or a special purpose image running in firmware. Applications can run on these system images, such as applications 716, 720, 728, and 732 (illustratively designated application 1A, application 2, application 1B and application 3). Applications 716 and 728 are representative of separate instances of a common application program, and are thus illustratively designated with respective references of "1A" and "1B". In the illustrative example, application 716 and 720 run on system image 712 and applications 728 and 732 run on system image 724. As referred to herein, a virtual host comprises a system image, such as system image 712, or the combination of a system image and applications running within the system image. Thus, two virtual hosts are depicted in FIG. 7.

PCI family adapter 736 contains a set of physical adapter configuration resources 740 and physical adapter memory resources 744. The physical adapter configuration resources 740 and physical adapter memory resources 744 contain information describing the number of virtual adapters that PCI family adapter 736 can support and the physical resources allocated to each virtual adapter. As referred to herein, a virtual adapter is an allocation of a subset of physical adapter resources and virtualized resources, such as a subset of physical adapter resources and physical adapter memory, that is associated with a logical partition, such as system image 712 and applications 716 and 720 running on system image 712, as described more fully hereinbelow. LPAR manager 708 is provided a physical configuration resource interface 738, and physical memory configuration interface 742 to read and write into the physical adapter configuration resource and memory spaces during the adapter's initial configuration and reconfiguration. Through the physical configuration resource interface 738 and physical configuration memory interface 742, LPAR manager 708 creates virtual adapters and assigns physical resources to each virtual adapter. LPAR manager 708 may use one of the system images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows a configuration of PCI family adapter 736 configured with two virtual adapters. A first virtual adapter (designated virtual adapter 1) comprises virtual adapter resources 748 and virtual adapter memory 752 that were assigned by LPAR manager 708 and that is associated with system image 712 (designated system image 1). Similarly, a second virtual adapter (designated virtual adapter 2) comprises virtual adapter resources 756 and virtual adapter memory 760 that were assigned by LPAR manager 708 to virtual adapter 2 and that is associated with another system image 724 (designated system image 2). For an adapter used to connect to a direct attached storage, such as direct attached storage 108, 132, or 156 shown in FIG. 1, examples of virtual adapter resources may include: the list of the associated physical disks, a list of the associated logical unit numbers, and a list of the associated adapter functions (e.g., redundant arrays of inexpensive disks (RAID) level). For an adapter used to connect to a network, such as network 120 of FIG. 1, examples of virtual adapter resources may include: a list of the associated link level identifiers, a list of the associated network level identifiers, a list of the associated virtual fabric identifiers (e.g. Virtual LAN IDs for Ethernet fabrics, N-port IDs for Fibre Channel fabrics, and partition keys for InfiniBand fabrics), and a list of the associated network layers functions (e.g. network offload services).

After LPAR manager 708 configures the PCI family adapter 736, each system image is allowed to only communicate with the virtual adapters that were associated with that system image by LPAR manager 708. As shown in FIG. 7 (by solid lines), system image 712 is allowed to directly communicate with virtual adapter resources 748 and virtual adapter memory 752 of virtual adapter 1. System image 712 is not allowed to directly communicate with virtual adapter resources 756 and virtual adapter memory 760 of virtual adapter 2 as shown in FIG. 7 by dashed lines. Similarly, system image 724 is allowed to directly communicate with virtual adapter resources 756 and virtual adapter memory 760 of virtual adapter 2, and is not allowed to directly communicate with virtual adapter resources 748 and virtual adapter memory 752 of virtual adapter 1.

Figure 8:
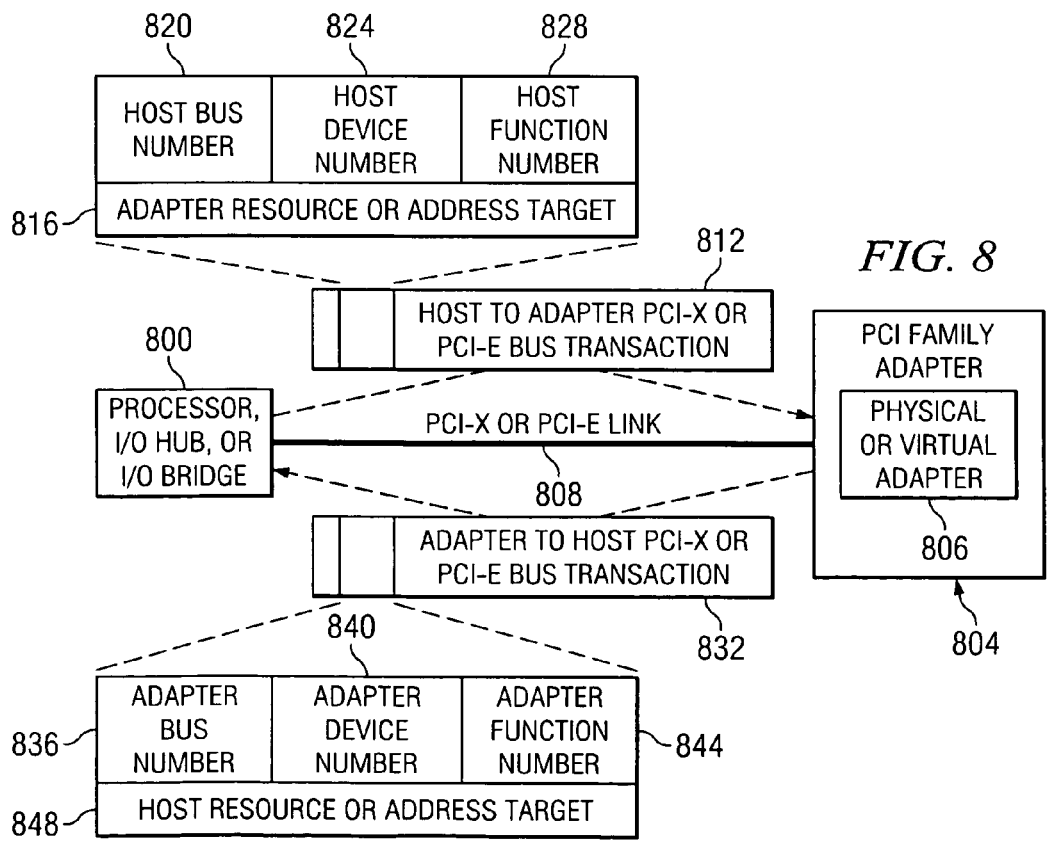
FIG. 8 is a diagram illustrating the control fields used in the PCI bus transaction to identify a virtual adapter or system image in accordance with a preferred embodiment of the present invention.

With reference now to FIG. 8, a depiction of a component, such as a processor, I/O hub, or I/O bridge 800, inside a host node, such as small host node 100, large host node 124, or small, integrated host node 144 shown in FIG. 1, that attaches a PCI family adapter, such as PCI family adapter 804, through a PCI-X or PCI-E link, such as PCI-X or PCI-E Link 808, in accordance with a preferred embodiment of the present invention is shown.

FIG. 8 shows that when a system image, such as system image 712 or 724, or LPAR manager 708 shown in FIG. 7 performs a PCI-X or PCI-E bus transaction, such as host to adapter PCI-X or PCI-E bus transaction 812, the processor, I/O hub, or I/O bridge 800 that connects to the PCI-X or PCI-E link 808 which issues the host to adapter PCI-X or PCI-E bus transaction 812 fills in the bus number, device number, and function number fields in the PCI-X or PCI-E bus transaction. The processor, I/O hub, or I/O bridge 800 has two options for how to fill in these three fields: it can either use the same bus number, device number, and function number for all software components that use the processor, I/O hub, or I/O bridge 800; or it can use a different bus number, device number, and function number for each software component that uses the processor, I/O hub, or I/O bridge 800. The originator or initiator of the transaction may be a software component, such as system image 712 or system image 724 (or an application running on a system image), or LPAR manager 708.

If the processor, I/O hub, or I/O bridge 800 uses the same bus number, device number, and function number for all transaction initiators, then when a software component initiates a PCI-X or PCI-E bus transaction, such as host to adapter PCI-X or PCI-E bus transaction 812, the processor, I/O hub, or I/O bridge 800 places the processor, I/O hub, or I/O bridge's bus number in the PCI-X or PCI-E bus transaction's requester bus number field 820, such as requester bus number 544 field of the PCI-X transaction shown in FIG. 5 or requester bus number 684 field of the PCI-E transaction shown in FIG. 6. Similarly, the processor, I/O hub, or I/O bridge 800 places the processor, I/O hub, or I/O bridge's device number in the PCI-X or PCI-E bus transaction's requester device number 824 field, such as requestor device number 548 field shown in FIG. 5 or requester device number 688 field shown in FIG. 6. Finally, the processor, I/O hub, or I/O bridge 800 places the processor, I/O hub, or I/O bridge's function number in the PCI-X or PCI-E bus transaction's requester function number 828 field, such as requester function number 552 field shown in FIG. 5 or requestor function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address 816 field in FIG. 8.

If the processor, I/O hub, or I/O bridge 800 uses a different bus number, device number, and function number for each transaction initiator, then the processor, I/O hub, or I/O bridge 800 assigns a bus number, device number, and function number to the transaction initiator. When a software component initiates a PCI-X or PCI-E bus transaction, such as host to adapter PCI-X or PCI-E bus transaction 812, the processor, I/O hub, or I/O bridge 800 places the software component's bus number in the PCI-X or PCI-E bus transaction's requester bus number 820 field, such as requestor bus number 544 field shown in FIG. 5 or requester bus number 684 field shown in FIG. 6. Similarly, the processor, I/O hub, or I/O bridge 800 places the software component's device number in the PCI-X or PCI-E bus transaction's requester device number 824 field, such as requester device number 548 field shown in FIG. 5 or requestor device number 688 field shown in FIG. 6. Finally, the processor, I/O hub, or I/O bridge 800 places the software component's function number in the PCI-X or PCI-E bus transaction's requestor function number 828 field, such as requestor function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address field 816 in FIG. 8.

FIG. 8 also shows that when physical or virtual adapter 806 performs PCI-X or PCI-E bus transactions, such as adapter to host PCI-X or PCI-E bus transaction 832, the PCI family adapter, such as PCI physical family adapter 804, that connects to PCI-X or PCI-E link 808 which issues the adapter to host PCI-X or PCI-E bus transaction 832 places the bus number, device number, and function number associated with the physical or virtual adapter that initiated the bus transaction in the requestor bus number, device number, and function number 836, 840, and 844 fields. Notably, to support more than one bus or device number, PCI family adapter 804 must support one or more internal busses (For a PCI-X adapter, see the PCI-X Addendum to the PCI Local Bus Specification Revision 1.0 or 1.0a; for a PCI-E adapter see PCI-Express Base Specification Revision 1.0 or 1.0a the details of which are herein incorporated by reference). To perform this function, LPAR manager 708 associates each physical or virtual adapter to a software component running by assigning a bus number, device number, and function number to the physical or virtual adapter. When the physical or virtual adapter initiates an adapter to host PCI-X or PCI-E bus transaction, PCI family adapter 804 places the physical or virtual adapter's bus number in the PCI-X or PCI-E bus transaction's requestor bus number 836 field, such as requestor bus number 544 field shown in FIG. 5 or requester bus number 684 field shown in FIG. 6 (shown in FIG. 8 as adapter bus number 836). Similarly, PCI family adapter 804 places the physical or virtual adapter's device number in the PCI-X or PCI-E bus transaction's requester device number 840 field, such as Requestor device Number 548 field shown in FIG. 5 or requestor device number 688 field shown in FIG. 6 (shown in FIG. 8 as adapter device number 840). PCI family adapter 804 places the physical or virtual adapter's function number in the PCI-X or PCI-E bus transaction's requester function number 844 field, such as requester function number 552 field shown in FIG. 5 or requestor function number 692 field shown in FIG. 6 (shown in FIG. 8 as adapter function number 844). Finally, PCI family adapter 804 also places in the PCI-X or PCI-E bus transaction the memory address of the software component that is associated, and targeted by, the physical or virtual adapter in host resource or address 848 field.

Figure 9:
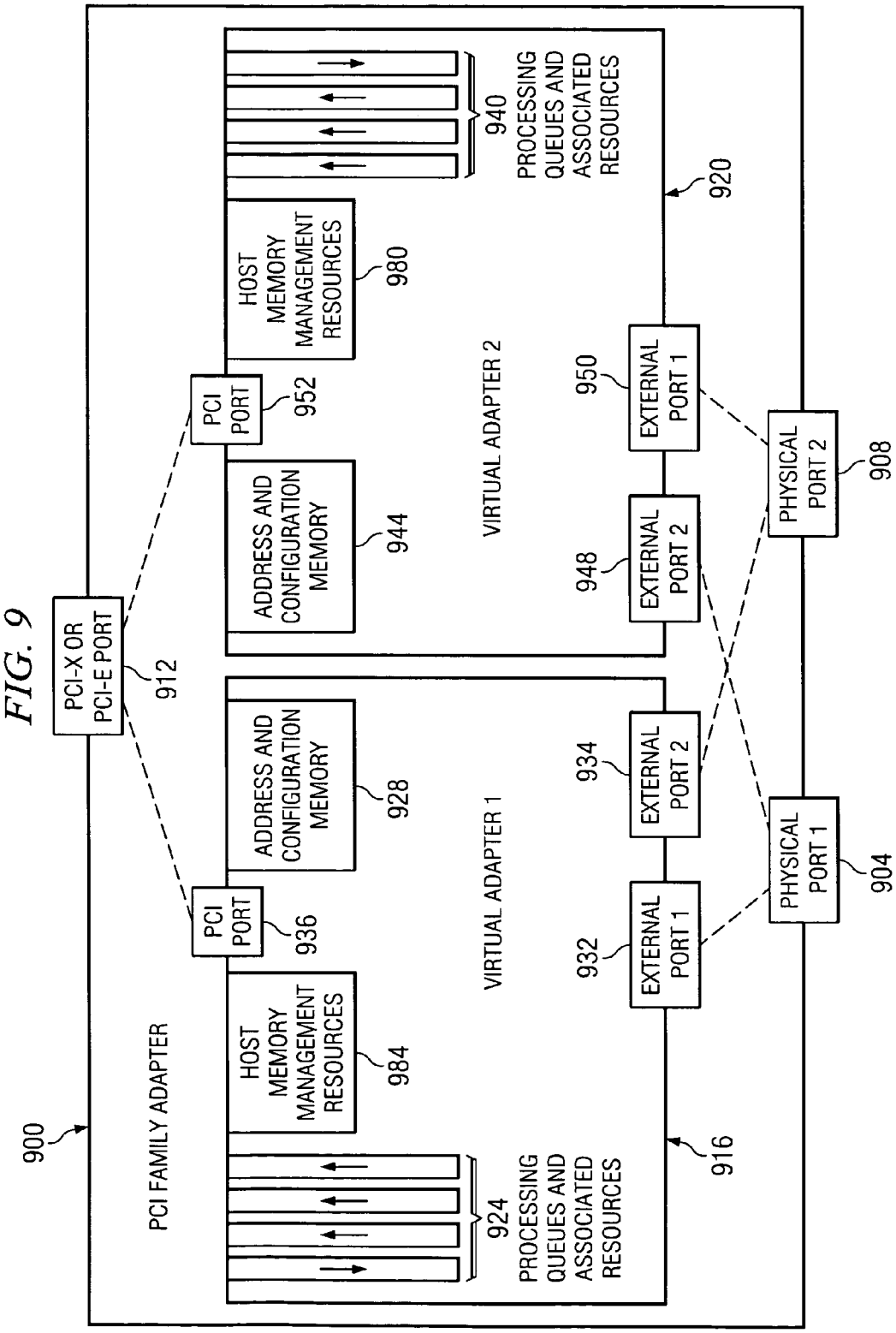
FIG. 9 is a diagram illustrating the adapter resources that must be virtualized in order to allow: an adapter to directly access virtual host resources; allow a virtual host to directly access adapter resources; and allow a non-PCI port on the adapter to access resources on the adapter or host in accordance with a preferred embodiment of the present invention.

With reference now to FIG. 9, a functional block diagram of a PCI adapter with two virtual adapters depicted in accordance with a preferred embodiment of the present invention is shown. Exemplary PCI family adapter 900 is configured with two virtual adapters 916 and 920 (illustratively designated virtual adapter 1 and virtual adapter 2). PCI family adapter 900 may contain one (or more) PCI family adapter ports (also referred to herein as an upstream port), such as PCI-X or PCI-E adapter port 912 that interface with a host system, such as small host node 100, large host node 124, or small integrated host node 144 shown in FIG. 1. PCI family adapter 900 may also contain one (or more) device or network ports (also referred to herein as downstream ports), such as physical port 904 and physical port 908 that interface with a peripheral or network device.

FIG. 9 also shows the types of resources that can be virtualized on a PCI adapter. The resources of PCI family adapter 900 that may be virtualized include processing queues, address and configuration memory, adapter PCI ports, host memory management resources and downstream physical ports, such as device or network ports. In the illustrative example, virtualized resources of PCI family adapter 900 allocated to virtual adapter 916 include, for example, processing queues 924, address and configuration memory 928, PCI virtual port 936 that is a virtualization of adapter PCI port 912, host memory management resources 984 (such as memory region registration and memory window binding resources on InfiniBand or iWARP), and virtual device or network ports, such as virtual external port 932 and virtual external port 934 that are virtualizations of physical ports 904 and 908. PCI virtual ports and virtual device and network ports are also referred to herein simply as virtual ports. Similarly, virtualized resources of PCI family adapter 900 allocated to virtual adapter 920 include, for example, processing queues 940, address and configuration memory 944, PCI virtual port 952 that is a virtualization of adapter PCI port 912, host memory management resources 980, and virtual device or network ports, such as virtual external port 948 and virtual external port 950 that are respectively virtualizations of respective physical ports 904 and 908.

Figure 10:
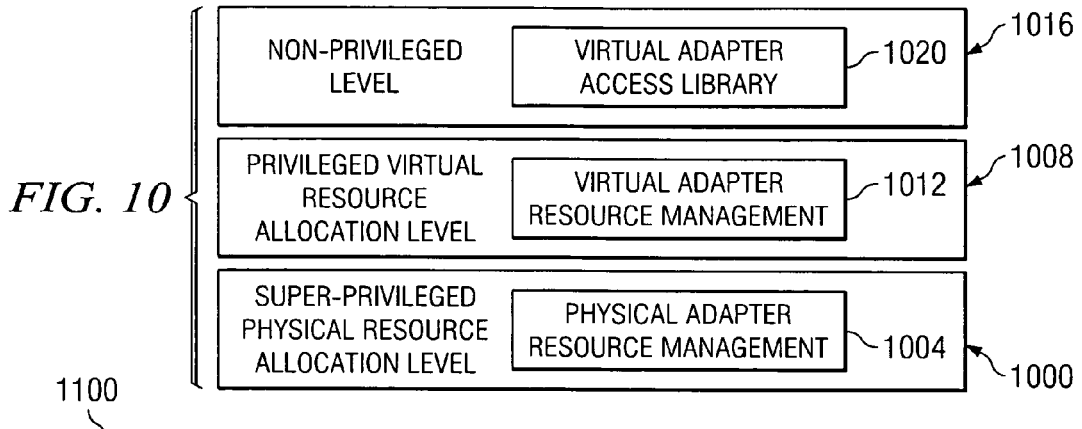
FIG. 10 is a diagram illustrating the creation of the three access control levels used to manage a PCI family adapter that supports I/O virtualization in accordance with a preferred embodiment of the present invention.

Turning next to FIG. 10, a functional block diagram of the access control levels on a PCI family adapter, such as PCI family adapter 900 shown in FIG. 9, is depicted in accordance with a preferred embodiment of the present invention. The three levels of access are a super-privileged physical resource allocation level 1000, a privileged virtual resource allocation level 1008, and a non-privileged level 1016.

The functions performed at the super-privileged physical resource allocation level 1000 include but are not limited to: PCI family adapter queries, creation, modification and deletion of virtual adapters, submission and retrieval of work, reset and recovery of the physical adapter, and allocation of physical resources to a virtual adapter instance. The PCI family adapter queries are used to determine, for example, the physical adapter type (e.g. Fibre Channel, Ethernet, iSCSI, parallel SCSI), the functions supported on the physical adapter, and the number of virtual adapters supported by the PCI family adapter. The LPAR manager, such as LPAR manager 708 shown in FIG. 7, performs the physical adapter resource management 1004 functions associated with super-privileged physical resource allocation level 1000. However, the LPAR manager may use a system image, for example an I/O hosting partition, to perform the physical adapter resource management 1004 functions.

The functions performed at the privileged virtual resource allocation level 1008 include, for example, virtual adapter queries, allocation and initialization of virtual adapter resources, reset and recovery of virtual adapter resources, submission and retrieval of work through virtual adapter resources, and, for virtual adapters that support offload services, allocation and assignment of virtual adapter resources to a middleware process or thread instance. The virtual adapter queries are used to determine: the virtual adapter type (e.g. Fibre Channel, Ethernet, iSCSI, parallel SCSI) and the functions supported on the virtual adapter. A system image, such as system image 712 shown in FIG. 7, performs the privileged virtual adapter resource management 1012 functions associated with virtual resource allocation level 1008.

Finally, the functions performed at the non-privileged level 1016 include, for example, query of virtual adapter resources that have been assigned to software running at the non-privileged level 1016 and submission and retrieval of work through virtual adapter resources that have been assigned to software running at the non-privileged level 1016. An application, such as application 716 shown in FIG. 7, performs the virtual adapter access library 1020 functions associated with non-privileged level 1016.

Figure 11:
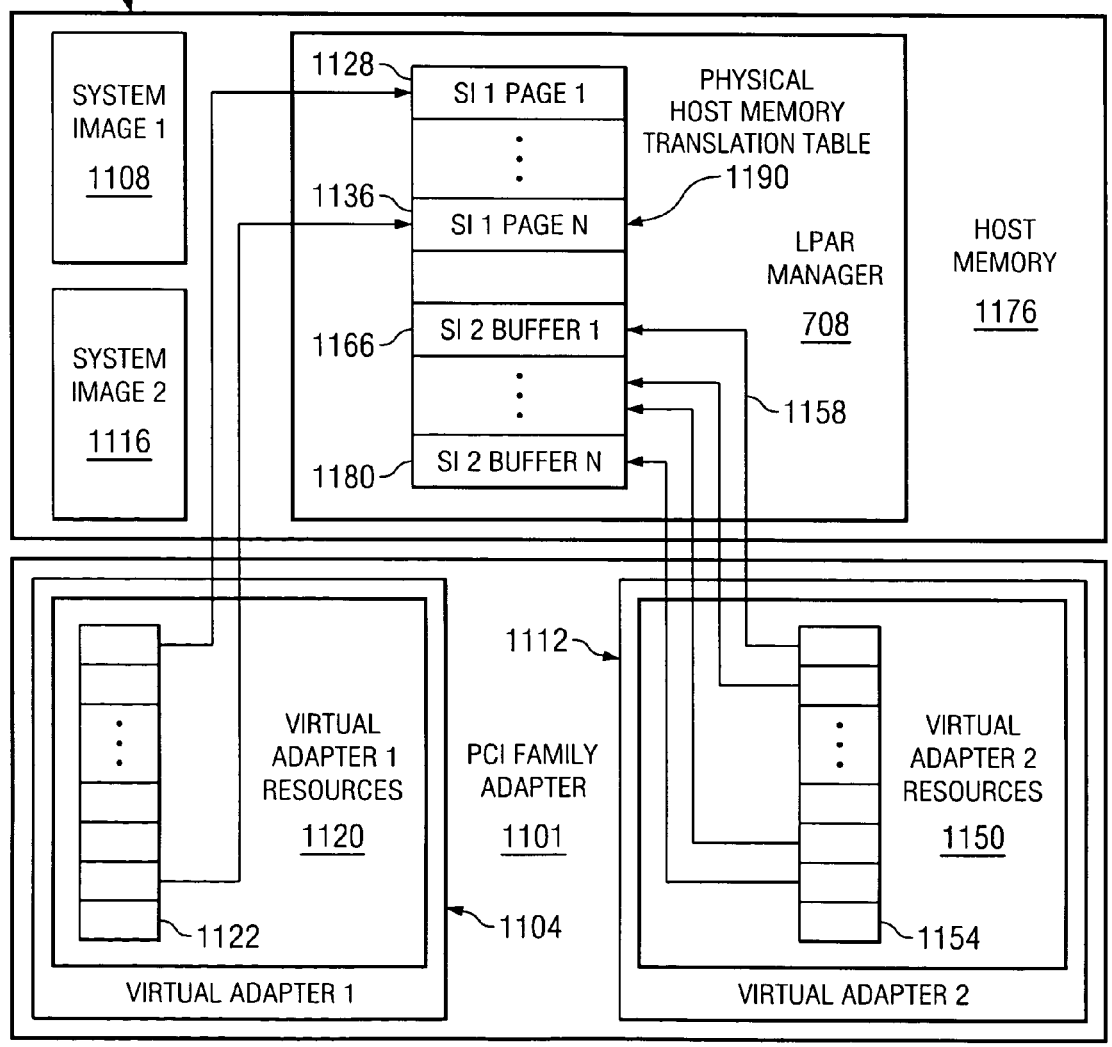
FIG. 11 is a diagram illustrating how host memory that is associated with a system image is made available to a virtual adapter that is associated with that system image through the Hypervisor in accordance with a preferred embodiment of the present invention.

Turning next to FIG. 11, a functional block diagram of host memory addresses that are made accessible to a PCI family adapter is depicted in accordance with a preferred embodiment of the present invention. PCI family adapter 1101 is an example of PCI family adapter 900 that may have virtualized resources as described above in FIG. 9.

FIG. 11 depicts four different mechanisms by which a LPAR manager 708 can associate host memory to a system image and to a virtual adapter. Once host memory has been associated with a system image and a virtual adapter, the virtual adapter can then perform DMA write and read operations directly to the host memory. System images 1108 and 1116 are examples of system images, such as system images 712 and 724 described above with reference to FIG. 7, that are respectively associated with virtual adapters 1104 and 1112. Virtual adapters 1104 and 1112 are examples of virtual adapters, such as virtual adapters 916 and 920 described above with reference to FIG. 9, that comprise respective allocations of virtual adapter resources and virtual adapter memory.

The first exemplary mechanism that LPAR manager 708 can use to associate and make available host memory to a system image and to one or more virtual adapters is to write into the virtual adapter's resources a system image association list 1122. Virtual adapter resources 1120 contains a list of PCI bus addresses, where each PCI bus address in the list is associated by the platform hardware to the starting address of a system image (SI) page, such as SI 1 page 1 1128 through SI 1 page N 1136 allocated to system image 1108. Virtual adapter resources 1120 also contains the page size, which is equal for all the pages in the list. At initial configuration, and during reconfigurations, LPAR manager 708 loads system image association list 1122 into virtual adapter resources 1120. The system image association list 1122 defines the set of addresses that virtual adapter 1104 can use in DMA write and read operations. After the system image association list 1122 has been created, virtual adapter 1104 must validate that each DMA write or DMA read requested by system image 1108 is contained within a page in the system image association list 1122. If the DMA write or DMA read requested by system image 1108 is contained within a page in the system image association list 1122, then virtual adapter 1104 may perform the operation. Otherwise virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 validates DMA write or read requests submitted by system image 1116. Particularly, virtual adapter 1112 provides validation for DMA read and write requests from system image 1116 by determining whether the DMA write or read request is in a page in system image association list (configured in a manner similarly to system image association list 1122) associated with system image pages of system image 1116.

The second mechanism that LPAR manager 708 can use to associate and make available host memory to a system image and to one or more virtual adapters is to write a starting page address and page size into system image association list 1122 in the virtual adapter's resources. For example, virtual adapter resources 1120 may contain a single PCI bus address that is associated by the platform hardware to the starting address of a system image page, such as SI 1 Page 1 1128. System image association list 1122 in virtual adapter resources 1120 also contains the size of the page. At initial configuration, and during reconfigurations, LPAR manager 708 loads the page size and starting page address into system image association list 1122 into the virtual adapter resources 1120. The system image association list 1122 defines the set of addresses that virtual adapter 1104 can use in DMA write and read operations. After the system image association list 1122 has been created, virtual adapter 1104 validates whether each DMA write or DMA read requested by system image 1108 is contained within a page in system image association list 1122. If the DMA write or DMA read requested by system image 1108 is contained within a page in the system image association list 1122, then virtual adapter 1104 may perform the operation. Otherwise, virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 may validate DMA write or read requests submitted by system image 1116. Particularly, a system image association list similar to system image association list 1122 may be associated with virtual adapter 1112. The system image association list associated with virtual adapter 1112 is loaded with a page size and starting page address of a system image page of system image 1116 associated with virtual adapter 1112. The system image association list associated with virtual adapter 1112 thus provides a mechanism for validation of DMA read and write requests from system image 1116 by determining whether the DMA write or read request is in a page in a system image association list associated with system image pages of system image 1116.

The third mechanism that LPAR manager 708 can use to associate and make available host memory to a system image and to one or more virtual adapters is to write into the virtual adapter's resources a system image buffer association list 1154. In FIG. 11, virtual adapter resources 1150 contains a list of PCI bus address pairs (starting and ending address), where each pair of PCI bus addresses in the list is associated by the platform hardware to a pair (starting and ending) of addresses of a system image buffer, such as SI 2 Buffer 1 1166 through SI 2 Buffer N 1180 allocated to system image 1116. At initial configuration, and during reconfigurations, LPAR manager 708 loads system image buffer association list 1154 into the virtual adapter resources 1150. The system image buffer association list 1154 defines the set of addresses that virtual adapter 1112 can use in DMA write and read operations. After the system image buffer association list 1154 has been created, virtual adapter 1112 validates whether each DMA write or DMA read requested by system image 1116 is contained within a buffer in system image buffer association list 1154. If the DMA write or DMA read requested by system image 1116 is contained within a buffer in the system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1112) to perform the check that determines if DMA write or DMA read operations requested by system image 1116 is contained within a buffer in the system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains PCI bus starting and ending address pairs in association with system image buffer starting and ending address pairs of buffers allocated to system image 1108 in a manner similar to that described above for system image 1116 and virtual adapter 1112.

The fourth mechanism that LPAR manager 708 can use to associate and make available host memory to a system image and to one or more virtual adapters is to write into the virtual adapter's resources a single starting and ending address in system image buffer association list 1154. In this implementation, virtual adapter resources 1150 contains a single pair of PCI bus starting and ending address that is associated by the platform hardware to a pair (starting and ending) of addresses associated with a system image buffer, such as SI 2 Buffer 1 1166. At initial configuration, and during reconfigurations, LPAR manager 708 loads the starting and ending addresses of SI 2 buffer 1 1166 into the system image buffer association list 1154 in virtual adapter resources 1150. The system image buffer association list 1154 then defines the set of addresses that virtual adapter 1112 can use in DMA write and read operations. After the system image buffer association list 1154 has been created, virtual adapter 1112 validates whether each DMA write or DMA read requested by system image 1116 is contained within the system image buffer association list 1154. If the DMA write or DMA read requested by system image 1116 is contained within system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1150) to perform the check that determines if DMA write or DMA read requested by system image 1116 is contained within a page system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains a single PCI bus starting and ending address in association with a system image buffer starting and ending address allocated to system image 1108 in a manner similar to that described above for system image 1116 and virtual adapter 1112.

Figure 12:
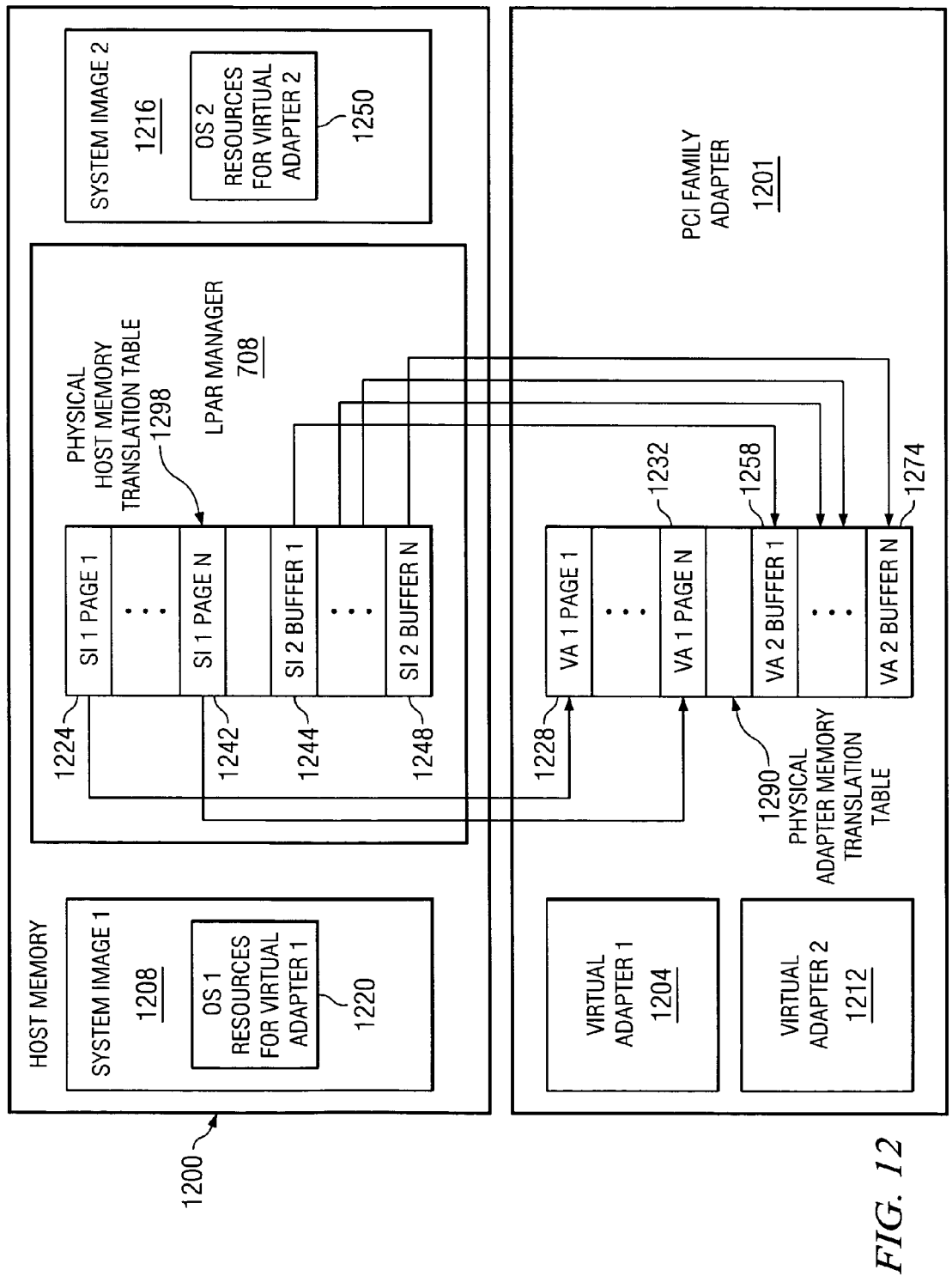
FIG. 12 is a diagram illustrating how a PCI family adapter allows the Hypervisor to associate memory in the PCI adapter to an system image and its associated virtual adapter in accordance with a preferred embodiment of the present invention.

Turning next to FIG. 12, a functional block diagram of a PCI family adapter configured with memory addresses that are made accessible to a system image is depicted in accordance with a preferred embodiment of the present invention.

FIG. 12 depicts four different mechanisms by which a LPAR manager can associate PCI family adapter memory to a virtual adapter, such as virtual adapter 1204, and to a system image, such as system image 1208. Once PCI family adapter memory has been associated to a system image and a virtual adapter, the system image can then perform Memory Mapped I/O write and read (i.e., store and load) operations directly to the PCI family adapter memory.

A notable difference between the system image and virtual adapter configuration shown in FIG. 11 and FIG. 12 exists. In the configuration shown in FIG. 11, PCI family adapter 1101 only holds a list of host addresses that do not have any local memory associated with them. If the PCI family adapter supports flow-through traffic, then data arriving on an external port can directly flow through the PCI family adapter and be transferred, through DMA writes, directly into these host addresses. Similarly, if the PCI family adapter supports flow-through traffic, then data from these host addresses can directly flow through the PCI family adapter and be transferred out of an external port. Accordingly, PCI family adapter 1101 shown in FIG. 11 does not include local adapter memory and thus is unable to initiate a DMA operation. On the other hand, PCI family adapter 1201 shown in FIG. 12 has local adapter memory that is associated with the list of host memory addresses. PCI family adapter 1201 can initiate, for example, DMA writes from its local memory to the host memory or DMA reads from the host memory to its local memory. Similarly, the host can initiate, for example, Memory Mapped I/O writes from its local memory to the PCI family adapter memory or Memory Mapped I/O reads from the PCI family adapter memory to the host's local memory.

The first and second mechanisms that LPAR manager 708 can use to associate and make available PCI family adapter memory to a system image and to a virtual adapter is to write into the PCI family adapter's physical adapter memory translation table 1290 a page size and the starting address of one (first mechanism) or more (second mechanism) pages. In this case all pages have the same size. For example, FIG. 12 depicts a set of pages that have been mapped between system image 1208 and virtual adapter 1204. Particularly, SI 1 Page 1 1224 through SI 1 Page N 1242 of system image 1208 are mapped (illustratively shown by interconnected arrows) to virtual adapter memory pages 1224-1232 of physical adapter 1201 local memory. For system image 1208, all associated pages 1224-1242 in the list have the same size. At initial configuration, and during reconfigurations, LPAR manager 708 loads the PCI family adapter's physical adapter memory translation table 1290 with the page size and the starting address of one or more pages. The physical adapter memory translation table 1290 then defines the set of addresses that virtual adapter 1204 can use in DMA write and read operations. After physical adapter memory translation table 1290 has been created, PCI family adapter 1201 (or virtual adapter 1204) validates that each DMA write or DMA read requested by system image 1208 is contained in the physical adapter memory translation table 1290 and is associated with virtual adapter 1204. If the DMA write or DMA read requested by system image 1208 is contained in the physical adapter memory translation table 1290 and is associated with virtual adapter 1204, then virtual adapter 1204 may perform the operation. Otherwise, virtual adapter 1204 is prohibited from performing the operation. The physical adapter memory translation table 1290 also defines the set of addresses that system image 1208 can use in Memory Mapped I/O (MMIO) write and read operations. After physical adapter memory translation table 1290 has been created, PCI family adapter 1201 (or virtual adapter 1204) validates whether the Memory Mapped I/O write or read requested by system image 1208 is contained in the physical adapter memory translation table 1290 and is associated with virtual adapter 1204. If the MMIO write or MMIO read requested by system image 1208 is contained in the physical adapter memory translation table 1290 associated with virtual adapter 1204, then virtual adapter 1204 may perform the operation. Otherwise virtual adapter 1204 is prohibited from performing the operation. It should be understood that in the present example, other system images and associated virtual adapters, e.g., system image 1216 and virtual adapter 1212, are configured in a similar manner for PCI family adapter 1201 (or virtual adapter 1212) validation of DMA operations and MMIO operations requested by system image 1216.

The third and fourth mechanisms that LPAR manager 708 can use to associate and make available PCI family adapter memory to a system image and to a virtual adapter is to write into the PCI family adapter's physical adapter memory translation table 1290 one (third mechanism) or more (fourth mechanism) buffer starting and ending addresses (or starting address and length). In this case, the buffers may have different sizes. For example, FIG. 12 depicts a set of varying sized buffers that have been mapped between system image 1216 and virtual adapter 1212. Particularly, SI 2 Buffer 1 1244 through SI 2 Buffer N 1248 of system image 1216 are mapped to virtual adapter buffers 1258-1274 of virtual adapter 1212. For system image 1216, the buffers in the list have different sizes. At initial configuration, and during reconfigurations, LPAR manager 708 loads the PCI family adapter's physical adapter memory translation table 1290 with the starting and ending address (or starting address and length) of one or more pages. The physical adapter memory translation table 1290 then defines the set of addresses that virtual adapter 1212 can use in DMA write and read operations. After physical adapter memory translation table 1290 has been created, PCI family adapter 1201 (or virtual adapter 1212) validates that each DMA write or DMA read requested by system image 1216 is contained in the physical adapter memory translation table 1290 and is associated with virtual adapter 1212. If the DMA write or DMA read requested by system image 1216 is contained in the physical adapter memory translation table 1290 and is associated with virtual adapter 1212, then virtual adapter 1212 may perform the operation. Otherwise, virtual adapter 1212 is prohibited from performing the operation. The physical adapter memory translation table 1290 also defines the set of addresses that system image 1216 can use in Memory Mapped I/O (MMIO) write and read operations. After physical adapter memory translation table 1290 has been created, PCI family adapter 1201 (or virtual adapter 1212) validates whether a MMIO write or read requested by system image 1216 is contained in the physical adapter memory translation table 1290 and is associated with virtual adapter 1212. If the MMIO write or MMIO read requested by system image 1216 is contained in the physical adapter memory translation table 1290 and is associated with virtual adapter 1212, then virtual adapter 1212 may perform the operation. Otherwise virtual adapter 1212 is prohibited from performing the operation. It should be understood that in the present example, other system images and associated virtual adapters, e.g., system image 1208 and associated virtual adapter 1204, are configured in a similar manner for PCI family adapter 1201 (or virtual adapter 1204) validation of DMA operations and MMIO operations requested by system image 1216.

Figure 13:
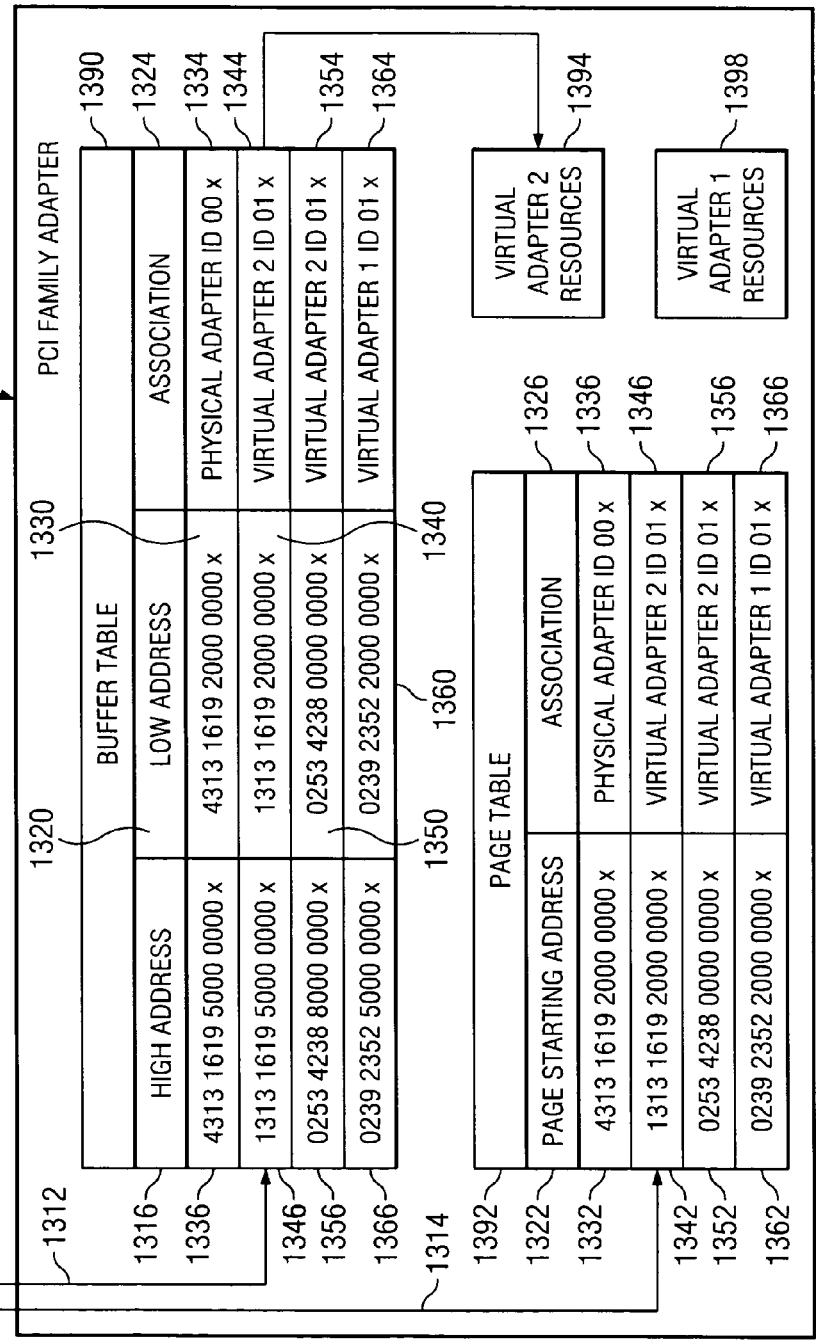
FIG. 13 is a diagram illustrating one of the options for determining the virtual adapter that is associated with an incoming memory address to assure that the functions performed by an incoming PCI bus transaction are within the scope of the virtual adapter that is associated with the memory address referenced in the incoming PCI bus transaction translation in accordance with a preferred embodiment of the present invention.

With reference next to FIG. 13, a functional block diagram of a PCI family adapter and a physical address memory translation table, such as a buffer table or a page table, is depicted in accordance with a preferred embodiment of the present invention.

FIG. 13 also depicts four mechanisms for how an address referenced in an incoming PCI bus transaction 1304 can be used to look up the virtual adapter resources (including the local PCI family adapter memory address that has been mapped to the host address), such as virtual adapter resources 1394 or 1398, associated with the memory address.

The first mechanism is to compare the memory address of incoming PCI bus transaction 1304 with each row of high address cell 1316 and low address cell 1320 in buffer table 1390. High address cell 1316 and low address cell 1320 respectively define an upper and lower address of a range of addresses associated with a corresponding virtual or physical adapter identified in association cell 1324. If incoming PCI bus transaction 1304 has an address that is lower than the contents of high address cell 1316 and that is higher than the contents of low address cell 1320, then incoming PCI bus transaction 1304 is within the high address and low address cells that are associated with the corresponding virtual adapter identified in association cell 1324. In such a scenario, the incoming PCI bus transaction 1304 is allowed to be performed on the matching virtual adapter. Alternatively, if incoming PCI bus transaction 1304 has an address that is not between the contents of high address cell 1316 and the contents of low address cell 1320, then completion or processing of incoming PCI bus transaction 1304 is prohibited. The second mechanism is to simply allow a single entry in buffer table 1390 per virtual adapter.

The third mechanism is to compare the memory address of incoming PCI bus transaction 1304 with each row of page starting address cell 1322 and with each row of page starting address cell 1322 plus the page size in page table 1392. If incoming PCI bus transaction 1304 has an address that is higher than or equal to the contents of page starting address cell 1322 and lower than page starting address cell 1322 plus the page size, then incoming PCI bus transaction 1304 is within a page that is associated with a virtual adapter. Accordingly, incoming PCI bus transaction 1304 is allowed to be performed on the matching virtual adapter. Alternatively, if incoming PCI bus transaction 1304 has an address that is not within the contents of page starting address cell 1322 and page starting address cell 1322 plus the page size, then completion of incoming PCI bus transaction 1304 is prohibited. The fourth mechanism is to simply allow a single entry in page table 1392 per virtual adapter.

Figure 14:
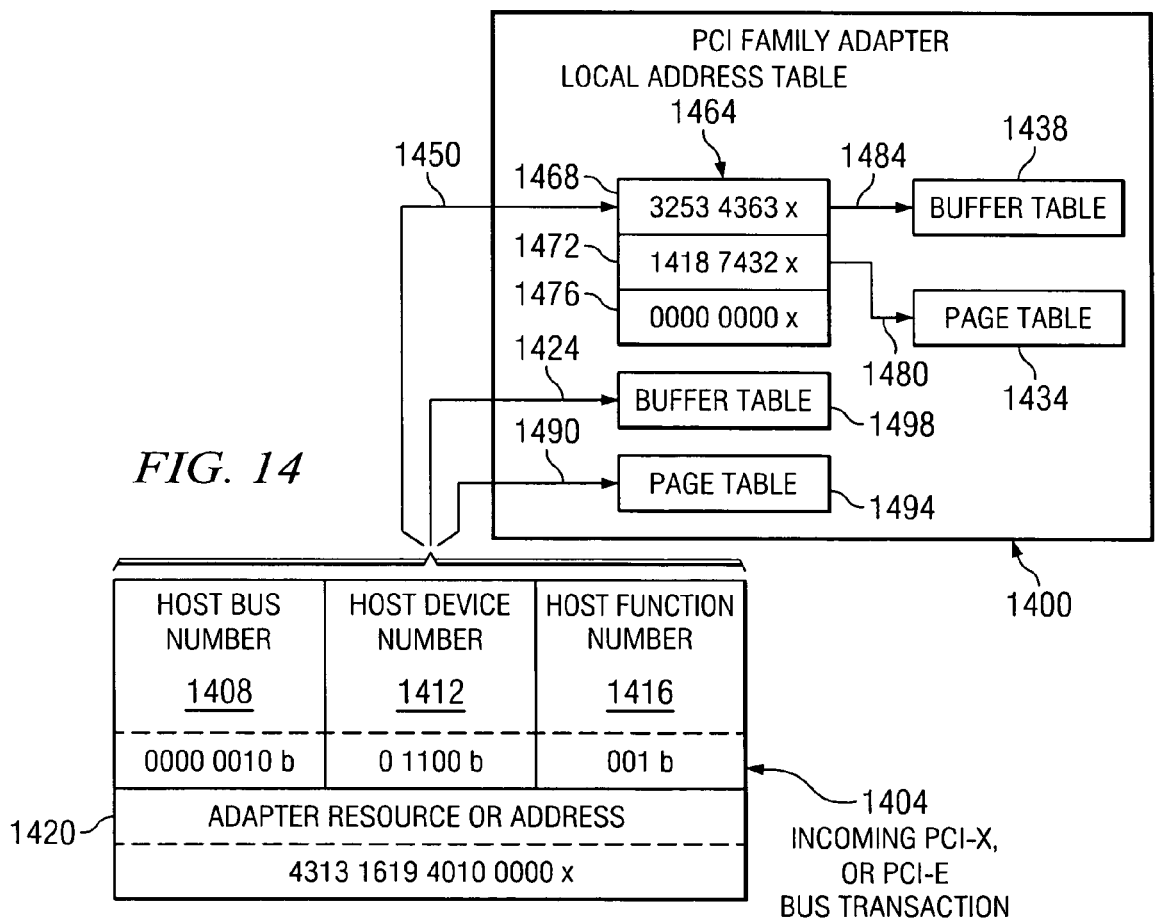
FIG. 14 is a diagram illustrating one of the options for determining the virtual adapter that is associated with an PCI-X or PCI-E bus transaction to assure that the functions performed by an incoming PCI bus transaction are within the scope of the virtual adapter that is associated with the requestor bus number, requestor device number, and requester function number referenced in the incoming PCI bus transaction translation in accordance with a preferred embodiment of the present invention.

With reference next to FIG. 14, a functional block diagram of a PCI family adapter and a physical address memory translation table, such as a buffer table, a page table, or an indirect local address table, is depicted in accordance with a preferred embodiment of the present invention.

FIG. 14 also depicts several mechanisms for how a requestor bus number, such as host bus number 1408, a requestor device number, such as host device number 1412, and a requestor function number, such as host function number 1416, referenced in incoming PCI bus transaction 1404 can be used to index into either buffer table 1498, page table 1494, or indirect local address table 1464. Buffer table 1498 is representative of buffer table 1390 shown in FIG. 13. Page table 1490 is representative of page table 1392 shown in FIG. 13. Local address table 1464 contains a local PCI family adapter memory address that references either a buffer table, such as buffer table 1438, or a page table, such as page table 1434, that only contains host memory addresses that are mapped to the same virtual adapter.

The requestor bus number, such as host bus number 1408, requester device number, such as host device number 1412, and requestor function number, such as host function number 1416, referenced in incoming PCI bus transaction 1404 provides an additional check beyond the memory address mappings that were set up by a host LPAR manager.

Figure 15:
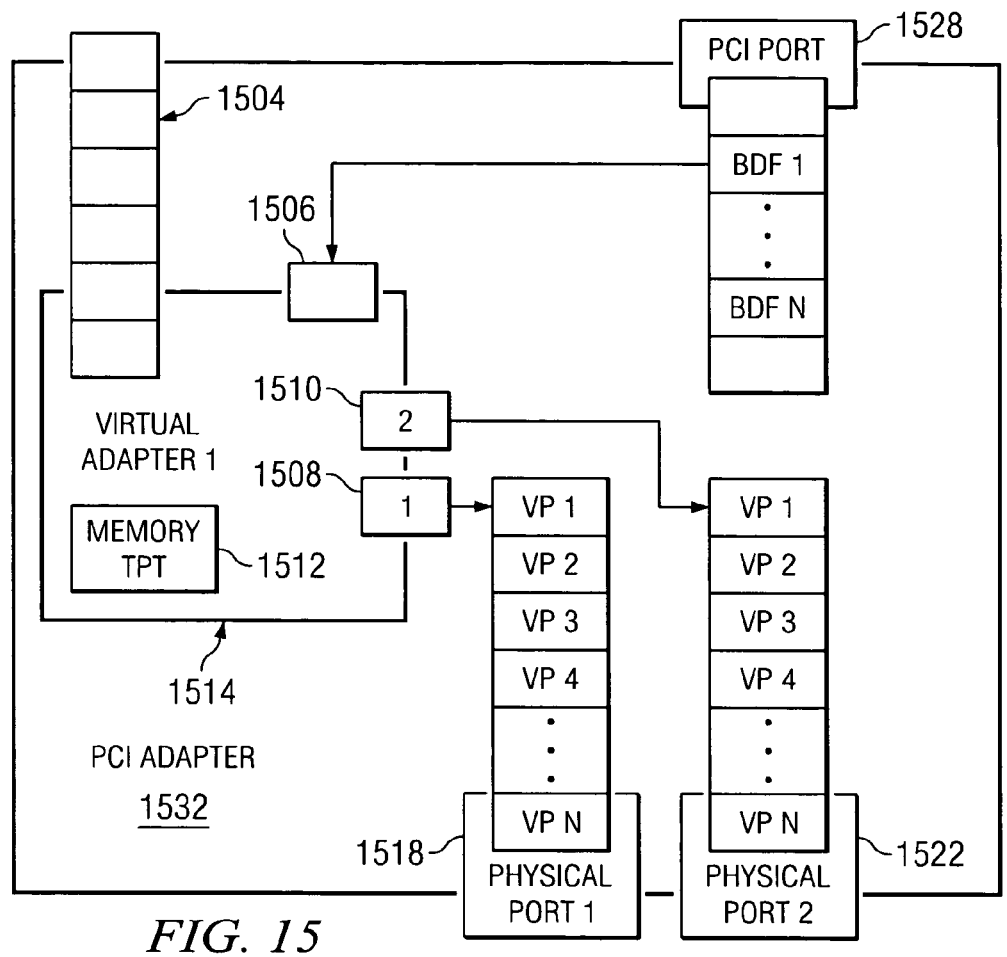
FIG. 15 is a diagram illustrating a virtual adapter management approach for virtualizing adapter in accordance with a preferred embodiment of the present invention.

Turning next to FIG. 15, a virtual adapter level management approach is depicted. Under this approach, a physical or virtual host creates one or more virtual adapters, such as virtual adapter 1 1514, each containing a set of resources that are within the scope of the physical adapter, such as PCI adapter 1532, and a set of resources are associated with the virtual adapter. The set of resources associated with the virtual adapter 1 1514, may include: processing queues and associated resources, such as 1504, a PCI port, such as 1528, for each PCI physical port, a PCI virtual port, such as 1506, that is associated with one of the possible addresses on the PCI physical port, one or more downstream physical ports, such as 1518 and 1522, for each downstream physical port, a downstream virtual port that is associated with one of the possible addresses on the physical port, such as 1508 and 1510, and one or more memory translation and protection tables (TPT), such as 1512.

Figure 16:
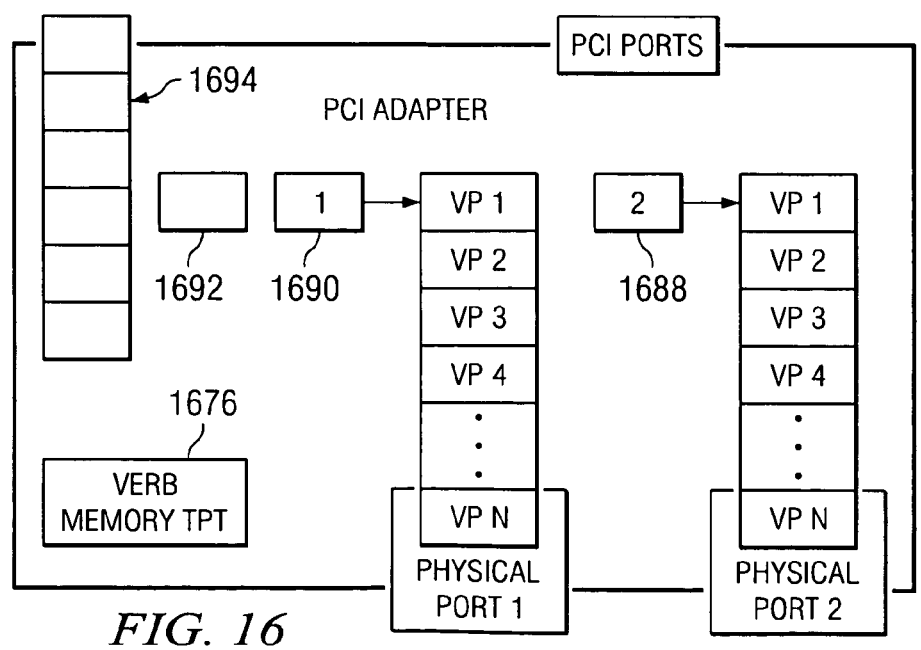
FIG. 16 is a diagram illustrating a virtual resource management approach for virtualizing adapter resources in accordance with a preferred embodiment of the present invention.

Turning next to FIG. 16, a virtual resource level management approach is depicted. When a resource is created, it is associated with a downstream and possibly an upstream virtual port. In this scenario, there is no concept of a virtual adapter. Under this approach, a physical or virtual host creates one or more virtual resources, such as virtual resource: 1694, which represents a processing queue, 1692, which represents a virtual PCI port, 1688 and 1690, which represent a virtual downstream port, and 1676, which represents a memory translation and protection table.

Figure 17:
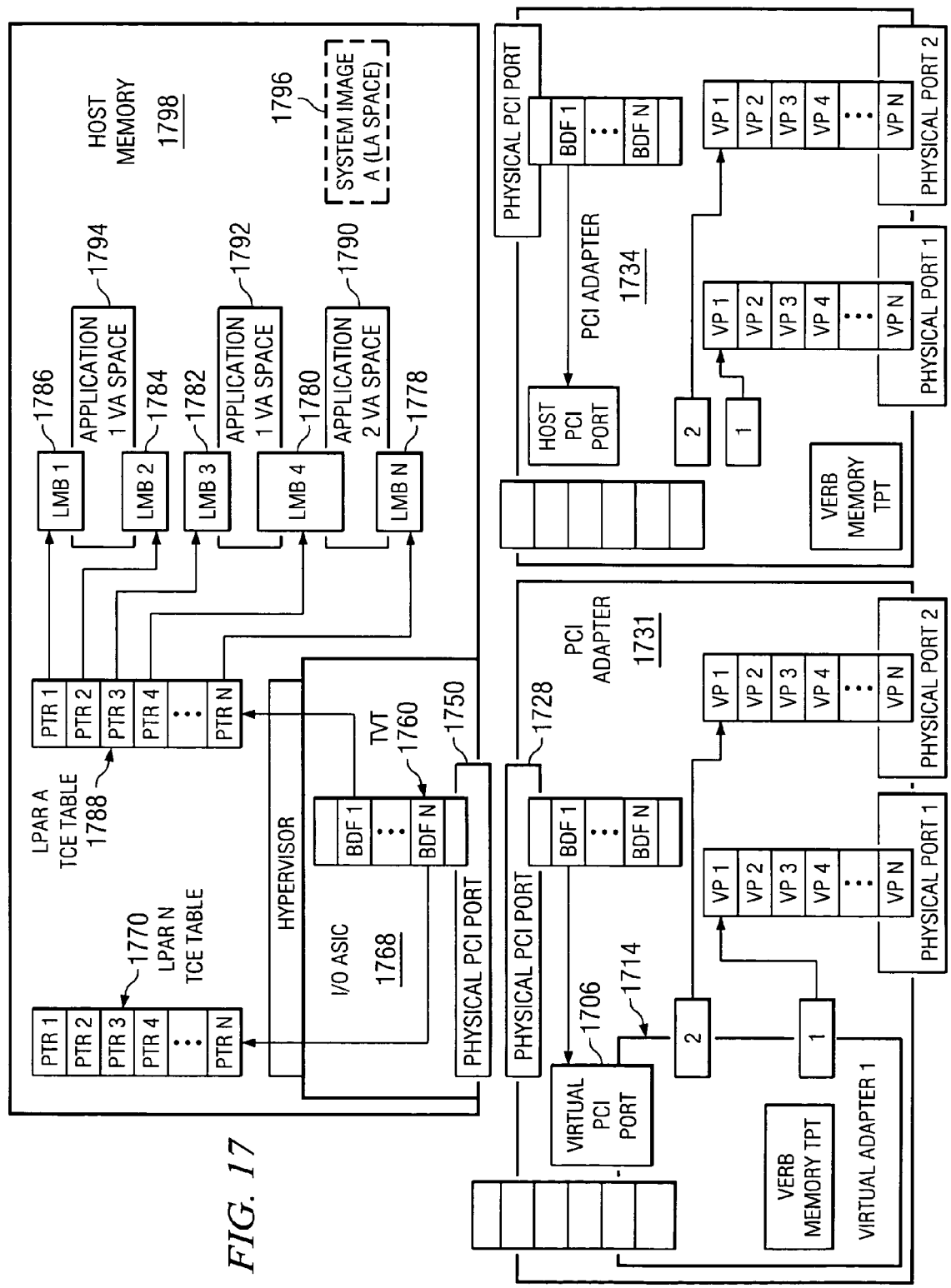
FIG. 17 is a diagram illustrating an adapter virtualization approach where a Hypervisor is responsible for managing the address translation and protection tables on the host and the system image is responsible for controlling the address translation and protection tables on the adapter in accordance with a preferred embodiment of the present invention.

With reference next to FIG. 17, a diagram illustrating an adapter virtualization approach that allows a system image within a multiple system image virtual server to directly expose a portion or all of its associated system memory to a shared PCI adapter without having to go through a trusted component, such as a Hypervisor, is depicted. Using the mechanisms described in this document, a system image is responsible for registering physical memory addresses it wants to expose to a virtual adapter or virtual resource with the Hypervisor. The Hypervisor is responsible for translating physical memory addresses exposed by a system image into real memory addresses used to access memory and into PCI bus addresses used on the PCI bus. The Hypervisor is responsible for setting up the host ASIC with these translations and access controls and communicating to the system image the PCI bus addresses associated with a system image registration. The system image is responsible for registering virtual or physical memory addresses, along with their PCI bus addresses with the adapter. The host ASIC is responsible for performing access control on memory mapped I/O operations and on incoming DMA and interrupt operations in accordance with a preferred embodiment of the present invention. The host ASIC can use the bus number, device number, and function number from PCI-X or PCI-E to assist in performing DMA and interrupt access control. The adapter is responsible for: associating a resource to one or more PCI virtual ports and to one or more virtual downstream ports; performing the registrations requested by a system image; and performing the I/O transaction requested by a system image in accordance with a preferred embodiment of the present invention.

FIG. 17 depicts a virtual system image, such as system image A 1796, which runs in host memory, such as host memory 1798, and has applications running on it. Each application has its own virtual address space, such App 1 VA Space 1792 and 1794, and App 2 VA Space 1790. The VA Space is mapped by the OS into a set of physically contiguous physical memory addresses. The Hypervisor maps physical memory addresses to real memory addresses and PCI bus addresses. In FIG. 17, Application 1 VA Space 1794 maps into a portion of Logical Memory Block (LMB) 1 1786 and 2 1784. Similarly, Application 1 VA Space 1792 maps into a portion of Logical Memory Block (LMB) 3 1782 and 4 1780. Finally, Application 2 VA Space 1790 maps into a portion of Logical Memory Block (LMB) 4 1780 and N 1778.

A system image, such as System Image A 1796 depicted in FIG. 17, does not directly expose the real memory addresses, such as the addresses used by the I/O ASIC, such as I/O ASIC 1768, used to reference Host Memory 1798, to the PCI adapter, such as PCI Adapter 1731 and 1734. Instead, the host depicted in FIG. 17 assigns an address translation and protection table to a system image and to either: a virtual adapter or virtual resource; a set of virtual adapters and virtual resources; or to all virtual adapters and virtual resources. For example, address translation and protection table defined as LPAR A TCE Table 1788, contains the list of host real memory addresses associated with System Image A 1796 and Virtual Adapter 1 1714.

The host depicted in FIG. 17 also contains an Indirect ATPT Index table, where each entry is referenced by the incoming PCI bus, device, function number and contains a pointer to one address translation and protection table. For example, the Indirect ATPT Index table defined as TVT 1760, contains a list of entries, where each entry is referenced by the incoming PCI bus, device, and function number and points one of ATPTs, such as TCE table 1788 and 1770. When I/O ASIC 1768 receives incoming DMA or interrupt operation from a virtual adapter or virtual resource, it uses the PCI bus, device, function number associated with the virtual adapter or virtual resource to look up an entry in the Indirect ATPT Index table, such as TVT 1760. It then validates that the address or interrupt referenced in the incoming DMA or interrupt operation, respectively, is in the list of addresses or interrupts listed in the ATPT that was pointed to by the Indirect ATPT Index table entry.

For example, in FIG. 17, Virtual Adapter 1731 has a virtual port 1706 that is associated with the bus, device, function number BDF 1 on PCI port 1728. When Virtual Adapter 1731 issues a PCI DMA operation out of PCI port 1728, the PCI operation contains the bus, device, function number BDF 1 which is associated with Virtual Adapter 1731. When PCI port 1750 on I/O ASIC 1768 receives a PCI DMA operation, it uses the operation's bus, device, function number BDF 1 to look up the ATPT associated with that virtual adapter or virtual resource in TVT 1760. In this example, the look up results in a pointer to LPAR A TCE table 1788. The system I/O ASIC 1768 then checks the address within the DMA operation to assure it is an address contained in LPAR A TCE table 1788. If it is, the DMA operation proceeds, otherwise it ends in error.

Using the mechanisms depicted in FIG. 17, the host side I/O ASIC, such as I/O ASIC 1768, also isolates Memory Mapped I/O (MMIO) operations to a virtual adapter or virtual resource granularity. It does this by: having the Hypervisor, or an intermediary, associate the PCI bus addresses accessible through system image MMIO operations to the system image associated with the virtual adapter or virtual resource that is accessible through those PCI bus addresses; and then having the host processor or I/O ASIC check that each system image MMIO operation references PCI bus addresses that have been associated with that system image.

FIG. 17 also depicts two PCI adapters: one that uses a Virtual Adapter Level Management approach, such as PCI Adapter 1731; and one that uses a Virtual Resource Level Management approach, such as PCI adapter 1734.

PCI Adapter 1731 associates to a host side system image the following: one set of processing queues; either a verb memory address translation and protection table or one set of verb memory address translation and protection table entries; one downstream virtual port; and one upstream Virtual Adapter (PCI) ID (VAID), such as the bus, device, function number. If the adapter supports out of user space access, such as would be the case for an InfiniBand Host Channel Adapter or an RDMA enabled NIC, then each data segment referenced in work requests can be validated by checking that the queue pair associated with the work request has the same protection domain as the memory region referenced by the data segment. However, this only validates the data segment, not the Memory Mapped I/O (MMIO) operation used to initiate the work request. The host is responsible for validating the MMIO.

Figure 18:
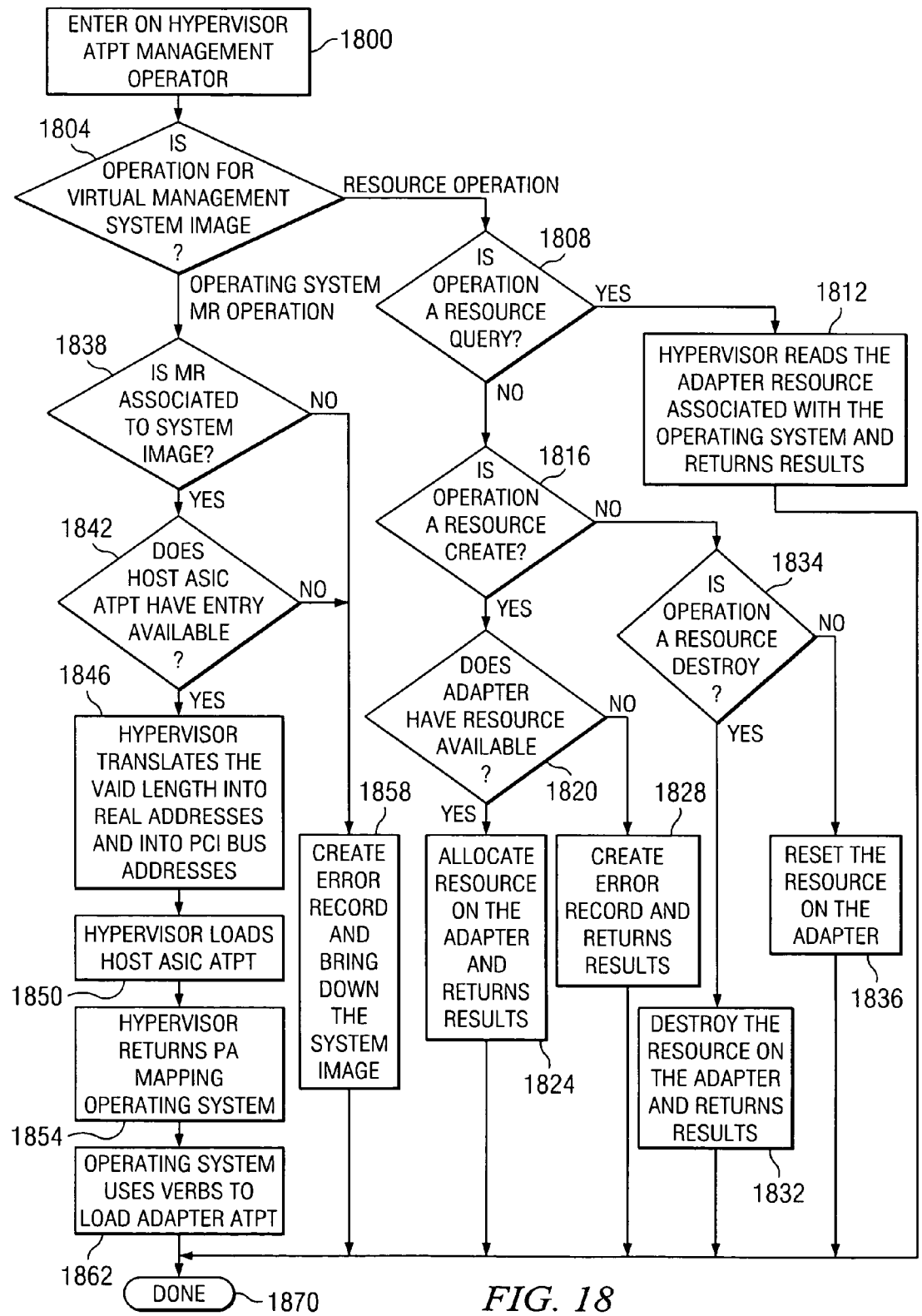
FIG. 18 is a flowchart outlining the functions used to manage the host and adapter address translations and protection tables.

FIG. 18 is a flowchart outlining the functions used to manage the host and adapter address translations and protection tables in accordance with a preferred embodiment of the present invention. The process begins when the Hypervisor, or a Hypervisor appointed intermediary, is invoked to perform an Address Translation and Protection Table (ATPT) operation in step 1800. The system image may perform the invocation in order to register physical memory addresses with the host ATPT, adapter ATPT, or both. A system user, through a management user interface, may perform the invocation in order to create, modify, or destroy an adapter instance and associate that adapter with a new or existing system image. The Hypervisor itself may perform the invocation in order to create, modify, or destroy an adapter instance and associate that adapter with a new or existing system image as a result of an autonomic computing initiated operation.

The Hypervisor then determines the type of management operation in step 1804. If the management operation is for the creation, query, modification, or destruction of a virtual adapter, in the case where the PCI adapter uses the Virtual Adapter Management Approach, then the next step is 1808. Otherwise it is a Memory Region (MR) management operation and the next step is 1838.

A virtual adapter consists of: a set of processing queues, one virtual downstream port identifier, one virtual adapter (upstream port) identifier, and either an address translation and protection table or a set of address translation and protection table entries. The processing queues includes: InfiniBand standard queue pairs, iWARP standard queue pairs, or queue pairs; InfiniBand standard completion queues, iWARP standard completion queues, or analogous completion queues; and InfiniBand standard asynchronous event queues, iWARP standard asynchronous event queues, or analogous asynchronous event queues.

A virtual resource consists of: a set of processing queues, which are associated to one virtual downstream port identifier and one virtual adapter (upstream port) identifier, and, through a protection domain either an address translation and protection table or a set of address translation and protection table entries. Again, the processing queues includes: InfiniBand standard queue pairs, iWARP standard queue pairs, or analogous queue pairs; InfiniBand standard completion queues, iWARP standard completion queues, or analogous completion queues; and InfiniBand standard asynchronous event queues, iWARP standard asynchronous event queues, or analogous asynchronous event queues.

In 1808, the Hypervisor determines if the management operation is a query of the attributes associated with a virtual adapter. If it is a query, then the Hypervisor, in 1812, queries the Virtual Adapter and returns the results of the query to the entity that invoked the Hypervisor. If the management operation is not a query, the next step is 1816.

In 1816, the Hypervisor determines if the management operation is a create of a virtual adapter. If it is not a virtual adapter create, then the Hypervisor continues to 1834. If the management operation is a create, then the Hypervisor, in 1820, determines if there are sufficient resources available to perform the creation. If there are sufficient resources, then in 1824, the Hypervisor allocates the resource on the adapter and returns the results to the entity that invoked the Hypervisor. If there are not sufficient resources, then in 1828, the Hypervisor creates an error record describing the number of resources still available and returns the results to the entity that invoked the Hypervisor.

In 1834, the Hypervisor determines if the management operation is a destroy of a virtual adapter. If it is a destroy, then the Hypervisor, in 1832, destroys the virtual adapter and returns the results to the entity that invoked the Hypervisor. Otherwise, in 1836, the PCI adapter resets the virtual adapter and returns the results to the entity that invoked the Hypervisor.

Turning back to step 1838, the Hypervisor determines if the memory region (MR) is associated with the system image that invoked the Hypervisor operation. If the memory region is a user space memory region, the Hypervisor performs this determination by translating the virtual address and length into a set of real memory addresses that are used by hardware to access memory. The Hypervisor then checks that those real memory addresses are associated with the system image that invoked the Hypervisor operation. If the MR is a privileged space MR or a user space MR that's been translated into physical memory addresses by the system image, then the Hypervisor does the MR check by translating the set of physical memory addresses, which are used by the system image to address memory, into a set of real memory addresses that are used by hardware to access memory. The Hypervisor then checks that those real memory addresses are associated with the system image that invoked the Hypervisor operation. If the MR is associated with the system image that invoked the Hypervisor operation, then the process continues to step 1842. Otherwise it continues to step 1858.

In 1842, the Hypervisor determines if the host ASIC Address Translation and Protection Table (ATPT) has enough entries available to contain the real memory addresses that were translated as part of step 1838. If the host ASIC Address Translation and Protection Table (ATPT) has enough entries available to contain the real memory addresses that were translated as part of step 1838, then the Hypervisor continues to step 1846. Otherwise it continues to step 1858.

In 1846, the Hypervisor uses the real memory addresses that resulted from step 1838 to create a set of associated PCI bus addresses. The Hypervisor loads the real memory address to PCI bus address mapping into the host ASIC's Adapter Translation and Protection table in 1850.

In 1854, the Hypervisor returns the PCI bus addresses that resulted from the mapping of step 1846 to the system image that invoked the Hypervisor. The system image in 1862 uses the adapter's InfiniBand standard, iWARP standard, or analogous verb semantic memory registration mechanism to register the MR using the PCI bus addresses to reference the "physical buffers or physical pages" defined by the InfiniBand standard, iWARP standard, or analogous verb semantic memory registration mechanism. During run-time the adapter uses the PCI bus addresses in the adapter's ATPT for direct memory accesses and the host ASIC converts these PCI bus addresses into real memory addresses through the host ASIC's ATPT.

In 1858, the Hypervisor creates an error record describing the number of reason the operation could not be completed and brings down the System Image that attempted the operation, with the process terminating thereafter.

Figure 19:
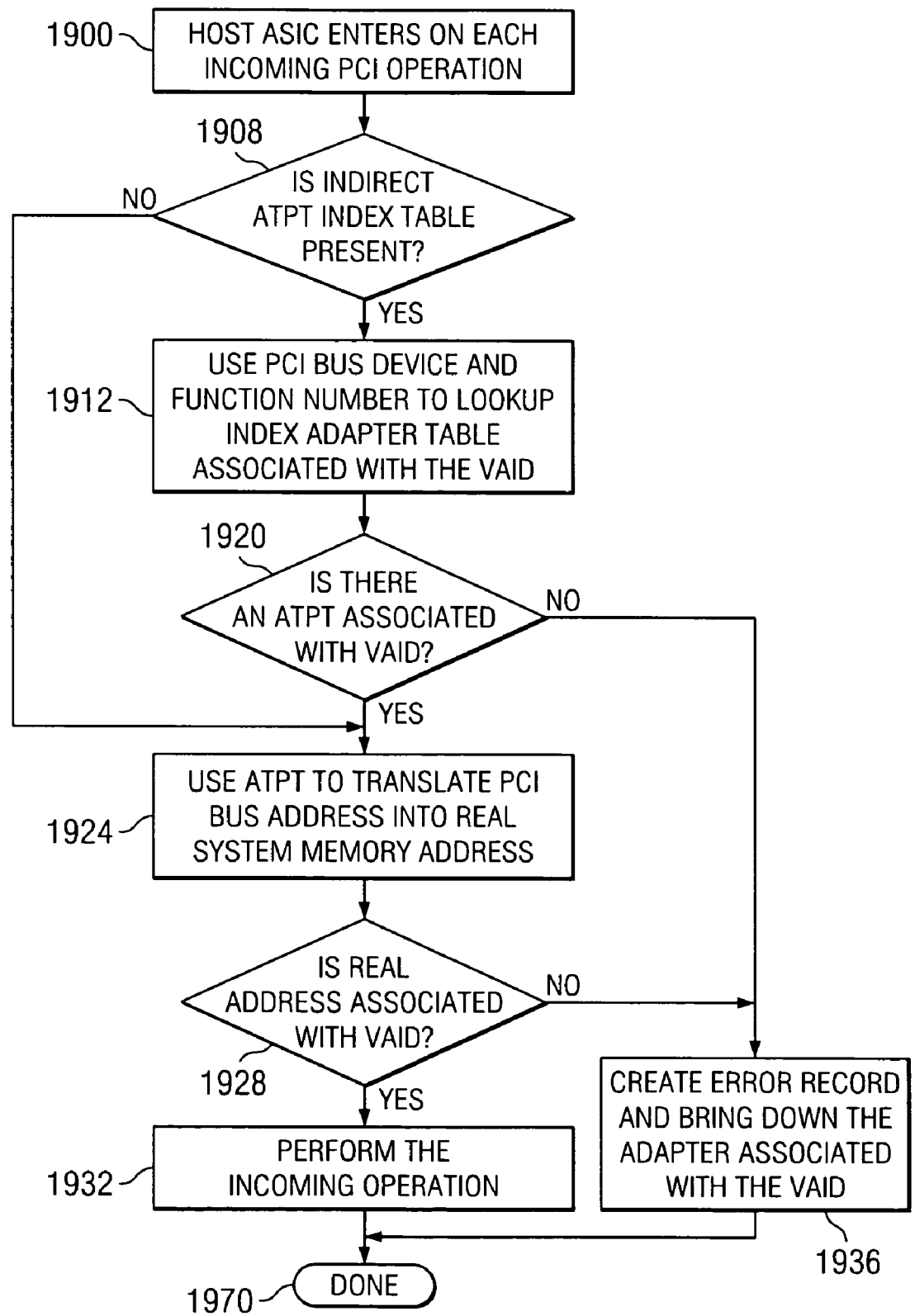
FIG. 19 is a flowchart outlining the functions performed at run-time on the host side to validate the memory access of an incoming operation from the adapter.

FIG. 19 is a flowchart outlining the functions performed at run-time on the host side to validate the memory access of an incoming operation from the adapter in accordance with a preferred embodiment of the present invention. The process begins with step 1900, when an operation targets the PCI Port of a host ASIC that allows a system image within a multiple system image virtual server to directly expose a portion, or all, of its associated system memory to a shared PCI Adapter without having to go through a trusted component, such as a Hypervisor, in accordance with a preferred embodiment of the present invention.

In 1908, if the host ASIC does not contain an indirect Address Translation and Protection Table (ATPT), the process jumps to step 1924. Otherwise the next step is 1912.

In 1912, the host ASIC uses the PCI bus number, device number, and function number that the adapter included in the PCI-X or PCI-E direct memory access operation to lookup (or as index into) the ATPT that is associated with the adapter.

In 1920, if the host ASIC has an ATPT associated with the PCI bus number, device number, and function number that the adapter included in the PCI-X or PCI-E Direct Memory Access operation, then process continues to step 1924. Otherwise, the process continues to step 1936.

In 1924, the host ASIC uses ATPT to translate the PCI bus address that the adapter included in the PCI-X or PCI-E Direct Memory Access operation to the real memory addresses needed to access real memory on the host. Next, in step 1928, the host ASIC uses checks to determine if the real memory addresses that resulted from the translation in step 1924 are associated with the system image that is associated with the PCI bus number, device number, and function number that the adapter included in the PCI-X or PCI-E Direct Memory Access operation. If the real memory addresses that resulted from the translation in step 1924 are associated with the System Image that is associated with the PCI bus number, device number, and function number that the adapter included in the PCI-X or PCI-E direct memory access operation, then the process continues to step 1932. In 1932, the host ASIC performs the DMA operation, with the process terminating thereafter.

If the real memory addresses that resulted from the translation in step 1924 are not associated with the system image associated with the PCI bus number, device number, and function number that the adapter included in the PCI-X or PCI-E direct memory access operation, then the process continues to step 1936. In 1936, the host ASIC creates an error record describing the reason the operation could not be completed, brings down the PCI Adapter associated with the PCI bus number, device number, and function number that the adapter included in the PCI-X or PCI-E Direct Memory Access operation, with the process terminating thereafter.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system that supports virtualization for performing a record operation, wherein the record operation allows a system image to record its memory addresses with a super-privileged resource, the method comprising:

receiving a memory record request from the system image;

translating a first memory address used by the system image into a second memory address used by one of a system processor and system input/output chips to access memory;

responsive to determining that the second memory address is associated with the system image that issued the memory record request, locating a memory record entry in one of a plurality of address translation and protection tables used by the one of a system processor and system input/output chips to access host memory;

creating a peripheral component interconnect bus address associated with the second memory address;

recording, into the memory record entry of the one of the plurality of address translation and protection tables a memory translation required to convert the peripheral component interconnect bus address into the second memory address;

recording into the memory record entry of the one of the plurality of address translation and protection tables a bus number, device number, and function number associated with one of a plurality of peripheral component interconnect bus adapters that is associated with the peripheral component interconnect bus address and second memory address;

responsive to determining that the record operation is successful, returning the peripheral component interconnect bus address to the system image that issued the memory record request;

creating an indirect address translation and protection table that includes a plurality of entries, each one of the plurality of entries being referenced by a bus number, device number, and function number associated with one of the plurality of peripheral component interconnect bus adapters;

including, in each one of the plurality of entries in the indirect address translation and protection table, a pointer to one of the plurality of address translation and protection tables;

receiving an operation from a particular one of the plurality of peripheral component interconnect bus adapters;

using a bus number, device number, and function number associated with the particular one of the plurality of peripheral component interconnect bus adapters to locate a particular entry in the indirect address translation and protection table; and using a particular pointer that is included in the located particular entry to identify a particular one of the plurality of address translation and protection tables.

2. The method of claim 1, wherein each one of the plurality of peripheral component interconnect bus adapters supports at least one virtual peripheral component interconnect bus adapter, and wherein each virtual peripheral component interconnect bus adapter is identified by a unique peripheral component interconnect bus number, device number, and function number.

3. The method of claim 1, wherein each one of the plurality of peripheral component interconnect bus adapters supports at least one virtual peripheral component interconnect bus adapter resource, and wherein each virtual peripheral component interconnect bus adapter resource is associated with a unique peripheral component interconnect bus number, device number, and function number.

4. The method of claim 1, further comprising:
bringing down the system image that issued the memory record request where the record operation requested a translation of a memory address not associated with the system image that issued the memory record request.

5. The method of claim 1, wherein the second memory address is a real memory address; and
wherein the one of the plurality of peripheral component interconnect bus adapters is one of a peripheral component interconnect input/output adapter, a PCI-X input/output adapter, and a PCI-Express input/output adapter.

6. The method of claim 1, wherein the system image directly exposes to the one of the plurality of peripheral component interconnect bus adapters the peripheral component interconnect bus address that is returned from the record operation performed by the super-privileged resource.

7. The method of claim 1, wherein the one of the plurality of peripheral component interconnect bus adapters, a virtual peripheral component interconnect bus adapter, or a virtual peripheral component interconnect bus adapter resource directly uses the peripheral component interconnect bus address passed by the system image to perform direct memory access operations.

8. The method of claim 1, wherein one of a system processor or system input/output chips uses the one of the plurality of address protection and translation tables to perform a peripheral component interconnect bus adapter initiated direct memory access operation; comprising:

receiving the direct memory address operation from the one of the plurality of peripheral component interconnect bus adapters;

translating the peripheral component interconnect bus address of the direct memory access operation into a real memory address;

responsive to a determination that the real memory address resulting from the translation is associated with the one of the plurality of peripheral component interconnect bus adapters that initiated the direct memory address operation, performing the direct memory access operation; and responsive to determining that the real memory address resulting from the translation is not associated with the one of the plurality of peripheral component interconnect adapters that initiated the direct memory address operation, bringing down the one of the plurality of peripheral component interconnect bus adapters that attempted the direct memory access operation.

9. The method of claim 1, wherein the translating, locating, and determining steps are performed at runtime to validate a memory access of a request from the virtual resource.

10. The method of claim 1, wherein the memory record request received from the system image is a virtual management operation; and
wherein the virtual management operation is one of a create virtual peripheral component interconnect adapter operation, a destroy virtual peripheral component interconnect adapter operation, a modify virtual peripheral component interconnect adapter operation, a query virtual peripheral component interconnect adapter operation, a create peripheral component interconnect adapter virtual resource operation, a destroy peripheral component interconnect adapter virtual resource operation, and a modify peripheral component interconnect adapter virtual resource operation.

11. The method of claim 10, wherein the super-privileged resource performs the create virtual peripheral component interconnect adapter operation, comprising:
responsive to determining that a physical peripheral component interconnect bus adapter has sufficient resources to carry out the create virtual peripheral component interconnect adapter operation, allocating the virtual peripheral component interconnect bus adapter's resources to the system image, wherein the allocating step includes associating a set of processing queues, peripheral component interconnect bus addresses, and downstream virtual ports to the virtual peripheral component interconnect adapter.

12. The method of claim 10, further comprising:
responsive to determining that a physical peripheral component interconnect bus adapter does not have sufficient resources to carry out the create virtual peripheral component interconnect adapter operation, returning an unable to complete the operation to the system image.

13. The method of claim 10, wherein the super-privileged resource performs the create peripheral component interconnect adapter virtual resource operation, comprising:
responsive to determining that a physical peripheral component interconnect bus adapter has sufficient resources to carry out the create peripheral component interconnect adapter virtual resource operation, allocating the physical peripheral component interconnect bus adapter's virtual resources to the system image, wherein the allocating step includes associating a processing queue to peripheral component interconnect bus addresses and downstream virtual ports to the peripheral component interconnect adapter virtual resource, and associating a peripheral component interconnect bus number, device number, and function number to the peripheral component interconnect adapter virtual resource.

14. The method of claim 10, further comprising:
responsive to determining that a physical peripheral component interconnect bus adapter does not have sufficient resources to carry out the create virtual peripheral component interconnect adapter operation, returning an unable to complete the operation to the system image.

15. The method of claim 10, wherein the super-privileged resource performs the modify virtual peripheral component interconnect adapter operation, comprising:
responsive to determining that a physical peripheral component interconnect bus adapter has sufficient resources to carry out the modify virtual peripheral component interconnect adapter operation and is associated with the system image that requested the operation, modifying the virtual peripheral component interconnect bus adapter's resources, wherein the modifying step includes associating a set of processing queues, peripheral component interconnect bus addresses, and downstream virtual ports to the virtual peripheral component interconnect adapter, and associating a peripheral component interconnect bus number, device number, and function number to the virtual peripheral component interconnect adapter.

16. The method of claim 10, further comprising:
responsive to determining that a physical peripheral component interconnect bus adapter does not have sufficient resources to carry out the create virtual peripheral component interconnect adapter operation or is not associated with the system image that requested the operation, returning an unable to complete the operation to the system image.

17. The method of claim 10, wherein the super-privileged resource performs the modify peripheral component interconnect adapter virtual resource operation, comprising:
responsive to determining that a physical peripheral component interconnect bus adapter has sufficient resources to carry out the modify peripheral component interconnect adapter virtual resource operation and is associated with the system image that requested the operation, modifying the physical peripheral component interconnect bus adapter's virtual resources, wherein the modifying step includes associating a processing queue to peripheral component interconnect bus addresses and downstream virtual ports to the peripheral component interconnect adapter virtual resource, and associating a peripheral component interconnect bus number, device number, and function number to the peripheral component interconnect adapter virtual resource.

18. The method of claim 10, further comprising:
responsive to determining that a physical peripheral component interconnect bus adapter does not have sufficient resources to carry out the modify peripheral component interconnect adapter virtual resource operation or is not associated with the system image that requested the operation, returning an unable to complete the operation to the system image.

19. The method of claim 10, wherein a super-privileged resource performs the destroy virtual peripheral component interconnect adapter operation, comprising:
responsive to determining that a physical peripheral component interconnect bus adapter has sufficient resources to carry out the destroy virtual peripheral component interconnect adapter operation and is associated with the system image that requested the operation, destroying the virtual peripheral component interconnect bus adapter's resources.

20. The method of claim 10, further comprising:
responsive to determining that a physical peripheral component interconnect bus adapter does not have sufficient resources to carry out the destroy virtual peripheral component interconnect adapter operation or is not associated with the system image that requested the operation, returning an unable to complete the operation to the system image.

21. The method of claim 10, wherein a super-privileged resource performs the destroy peripheral component interconnect adapter virtual resource operation; comprising:
responsive to determining that a physical peripheral component interconnect bus adapter has sufficient resources to carry out the destroy peripheral component interconnect adapter virtual resource operation and is associated with the system image that requested the operation, destroying the peripheral component interconnect bus adapter's virtual resources.

22. The method of claim 10, further comprising:
responsive to determining that a physical peripheral component interconnect bus adapter does not have sufficient resources to carry out the destroy peripheral component interconnect adapter virtual resource operation or is not associated with the system image that requested the operation, returning an unable to complete the operation to the system image.

23. The method of claim 10, wherein a super-privileged resource performs the query virtual peripheral component interconnect adapter operation, comprising:
responsive to determining that a virtual peripheral component interconnect bus adapter is associated with the system image that requested the operation, returning the virtual peripheral component interconnect bus adapter's resource attributes.

24. The method of claim 10, further comprising:
responsive to determining that a virtual peripheral component interconnect bus adapter is not associated with the system image that requested the operation, returning an unable to complete the operation to the system image.

25. The method of claim 10, wherein a super-privileged resource performs the query peripheral component interconnect adapter virtual resource operation, comprising:
responsive to determining that a virtual peripheral component interconnect bus adapter is associated with the system image that requested the operation, returning the virtual peripheral component interconnect bus adapter's resource attributes.

26. The method of claim 10, further comprising:
responsive to determining that a virtual peripheral component interconnect bus adapter is not associated with the system image that requested the operation, returning an unable to complete the operation to the system image.

* * * * *